US012379092B2

(12) United States Patent
Narendran et al.

(10) Patent No.: US 12,379,092 B2
(45) Date of Patent: Aug. 5, 2025

(54) 3D PRINTED INTERNAL CAVITY LENS FOR LIGHTING APPLICATIONS

(71) Applicant: Rensselaer Polytechnic Institute, Troy, NY (US)

(72) Inventors: Nadarajah Narendran, Clifton Park, NY (US); Akila Shan Udage, Troy, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 18/429,894

(22) Filed: Feb. 1, 2024

(65) Prior Publication Data
US 2024/0255118 A1 Aug. 1, 2024

Related U.S. Application Data

(60) Provisional application No. 63/442,567, filed on Feb. 1, 2023.

(51) Int. Cl.
*F21V 5/04* (2006.01)
*B29D 11/00* (2006.01)
(Continued)

(52) U.S. Cl.
CPC ................ *F21V 5/04* (2013.01); *G02B 3/02* (2013.01); *G02B 3/12* (2013.01); *G02B 27/0012* (2013.01);
(Continued)

(58) Field of Classification Search
CPC ........ G02B 3/02; G02B 3/12; G02B 27/0012; F21V 5/04; B29D 11/00019
See application file for complete search history.

(56) References Cited

U.S. PATENT DOCUMENTS 7,942,558 B2 * 5/2011 Zweig ................ G02B 6/4298
362/311.06
8,299,722 B2 10/2012 Melanson
(Continued)

FOREIGN PATENT DOCUMENTS

CN 106356469 A 1/2017
CN 110467704 A 11/2019
(Continued)

*Primary Examiner* — Zheng Song
(74) *Attorney, Agent, or Firm* — Barclay Damon LLP; Anthony P. Gangemi

(57) ABSTRACT

In an embodiment, there is provided an apparatus. The apparatus includes an optic configured for a selected illumination application. The optic includes a first lens structure and a second lens structure. The first lens structure includes a first planar external surface configured to receive incident light, and a first internal nonplanar refractive surface opposing the first planar external surface. The second lens structure includes a second planar external surface configured to emit output light, and a second internal nonplanar refractive surface opposing the second planar external surface. The second planar external surface opposes the first planar external surface. The first internal nonplanar refractive surface and the second internal nonplanar refractive surface define a cavity. The first internal nonplanar refractive surface, the second internal nonplanar refractive surface, and the cavity are positioned between the first planar external surface and the second planar external surface. The first internal nonplanar refractive surface and the second internal nonplanar refractive surface are configured to refract received light to yield emitted light having a target output parameter corresponding to the selected illumination application.

14 Claims, 12 Drawing Sheets

(51) Int. Cl.
*F21Y 115/10* (2016.01)
*G02B 3/02* (2006.01)
*G02B 3/12* (2006.01)
*G02B 27/00* (2006.01)

(52) U.S. Cl.
CPC ..... *B29D 11/00019* (2013.01); *F21Y 2115/10* (2016.08)

(56) References Cited

U.S. PATENT DOCUMENTS

| | | |
|---|---|---|
| 8,362,707 B2 | 1/2013 | Draper et al. |
| 8,491,165 B2 | 7/2013 | Bretschneider et al. |
| 8,543,249 B2 | 9/2013 | Chemel et al. |
| 10,138,331 B2 | 11/2018 | Li et al. |
| 10,216,975 B1 | 2/2019 | He et al. |
| 10,607,569 B2 | 3/2020 | Atkins |
| 2024/0111084 A1* | 4/2024 | Groet ................... G02B 6/0041 |
| 2024/0264373 A1* | 8/2024 | Duis ..................... G02B 6/122 |

FOREIGN PATENT DOCUMENTS

| | | |
|---|---|---|
| CN | 106369547 B | 1/2020 |
| KR | 1020200002364 | 1/2020 |
| WO | 2023049229 A1 | 3/2023 |

\* cited by examiner

3D PRINTED INTERNAL CAVITY LENS FOR LIGHTING APPLICATIONS

CROSS REFERENCE TO RELATED APPLICATION(S)

This application claims the benefit of U.S. Provisional Application No. 63/442,567, filed Feb. 1, 2023, which is incorporated by reference as if disclosed herein in its entirety.

FIELD

The present disclosure relates to a lens, in particular to, a three-dimensional (3D) printed internal cavity lens for lighting applications.

BACKGROUND

LED (light emitting diode) lighting systems generally include an LED light source and one or more subsystems, including optical, electrical, and thermomechanical components. The optical subsystem may use reflective, refractive, or a combination of reflective and refractive components to facilitate transfer luminous flux from the LED light source to a target surface. The optical subsystem may be configured to modify the received luminous flux to satisfy a target light level and a target distribution at the target surface based, at least in part, on a selected illuminance (i.e., illumination) application. A refractive optic, e.g., a lens, is a transparent material that has an associated index of refraction and a shaped external surface that may be configured to redirect a received light beam. Refractive optics exposed to an illuminance application physical environment can cause lumen depreciation, for example, from dust and dirt accumulation within contoured external surfaces (e.g., within crevices). The lumen depreciation may worsen over time, reducing an effectiveness of the secondary optics. Such a reduction in effectiveness may then result in failure to satisfy target light level and/or target light distribution of the selected illuminance application. It may be appreciated that lenses with non-flat external surfaces may pose challenges when assembling LED lighting systems.

SUMMARY

In an embodiment, there is provided an apparatus. The apparatus includes an optic configured for a selected illumination application. The optic includes a first lens structure and a second lens structure. The first lens structure includes a first planar external surface configured to receive incident light, and a first internal nonplanar refractive surface opposing the first planar external surface. The second lens structure includes a second planar external surface configured to emit output light, and a second internal nonplanar refractive surface opposing the second planar external surface. The second planar external surface opposes the first planar external surface. The first internal nonplanar refractive surface and the second internal nonplanar refractive surface define a cavity. The first internal nonplanar refractive surface, the second internal nonplanar refractive surface, and the cavity are positioned between the first planar external surface and the second planar external surface. The first internal nonplanar refractive surface and the second internal nonplanar refractive surface are configured to refract received light to yield emitted light having a target output parameter corresponding to the selected illumination application.

In some embodiments of the apparatus, a respective surface refractive geometry of each internal nonplanar refractive surface is determined based, at least in part, on a source parameter associated with a lighting source configured to provide the incident light, and based, at least in part, on a target output parameter associated with the selected illumination application.

In some embodiments of the apparatus, the target output parameter is selected from the group comprising illumination target geometry, illuminance uniformity and application efficiency.

In some embodiments of the apparatus, the cavity contains air.

In some embodiments of the apparatus, at least one of the first internal nonplanar refractive surface and/or the second internal nonplanar refractive surface is freeform.

In some embodiments of the apparatus, a respective surface refraction geometry of each internal nonplanar refractive surface is determined based, at least in part, on a light-energy mapping technique.

In some embodiments of the apparatus, each lens structure is manufactured using a three-dimensional (3D) printing technique.

In an embodiment, there is provided a method of designing an internal cavity lens having planar external surfaces, for a selected illumination application. The method includes determining, by a fractional portion circuitry, an illumination source distribution and an illuminance target. The method further includes dividing, by the fractional portion circuitry, the illumination source distribution into a number of fractional portions, and the illuminance target into the number of illuminance target portions. The method further includes determining, by an internal surface determination circuitry, a geometry of a first internal refractive surface and a geometry of a second internal refractive surface, using a light-energy mapping technique.

In some embodiments of the method, the geometries of the internal refractive surface are determined incrementally for each of the number of fractional portions.

In some embodiments, the method further includes comparing, by a comparison circuitry, a simulated illuminance distribution of a simulated internal cavity lens having an internal cavity bounded by internal refractive surfaces having the determined geometries and a target illuminance distribution. The method further includes adjusting, by the fractional portion circuitry, the number, if the simulated illuminance distribution is not within an allowable tolerance of the target illuminance distribution.

In some embodiments of the method, the illuminance source is a light emitting diode (LED) light source.

In some embodiments of the method, a shape of the illuminance target is selected from the group comprising circular, rectangular and square.

In an embodiment, there is provided a system configured for a selected illumination application. The system includes an illumination source; and an optic. The optic includes a first lens structure and a second lens structure. The first lens structure includes a first planar external surface configured to receive incident light from the illumination source, and a first internal nonplanar refractive surface opposing the first planar external surface. The second lens structure includes a second planar external surface configured to emit output light, and a second internal nonplanar refractive surface opposing the second planar external surface. The second planar external surface opposes the first planar external surface. The first internal nonplanar refractive surface and the second internal nonplanar refractive surface define a cavity. The first internal nonplanar refractive surface, the second internal nonplanar refractive surface, and the cavity are positioned between the first planar external surface and the second planar external surface. The first internal nonplanar refractive surface and the second internal nonplanar refractive surface are configured to refract received light to yield emitted light having a target output parameter corresponding to the selected illumination application.

In some embodiments of the system, a respective surface refractive geometry of each internal nonplanar refractive surface is determined based, at least in part, on a source parameter associated with a lighting source configured to provide the incident light, and based, at least in part, on a target output parameter associated with the selected illumination application.

In some embodiments of the system, the target output parameter is selected from the group comprising illumination target geometry, illuminance uniformity and application efficiency.

In some embodiments of the system, the cavity contains air.

In some embodiments of the system, at least one of the first internal nonplanar refractive surface and/or the second internal nonplanar refractive surface is freeform.

In some embodiment of the system s, a respective surface refraction geometry of each internal nonplanar refractive surface is determined based, at least in part, on a light-energy mapping technique.

In some embodiment of the system s, each lens structure is manufactured using a three-dimensional (3D) printing technique.

In some embodiments, there is provided a computer readable storage device. The device has stored thereon instructions that when executed by one or more processors result in the following operations including: any embodiment of the method.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1A:
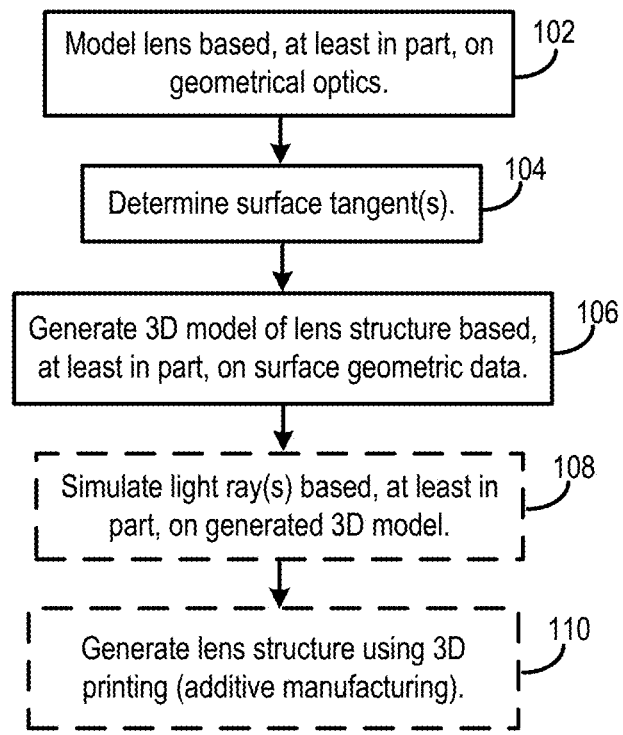
FIG. 1A is a flowchart of operations for designing an internal cavity lens having planar external surfaces, according to various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a lens, in particular to, a 3D (three-dimensional) printed internal cavity lens for lighting applications. An apparatus, system, and/or method, according to the present disclosure, is configured to provide a design strategy and a design technique for producing an optic configured for a selected illumination application. The optic includes a first lens structure and a second lens structure. The optic is configured to receive input light from an LED lighting source, and to yield emitted light having a target beam distribution corresponding to a selected illumination application. The optic is configured to refract the received light with internal refractive surfaces that define a cavity (i.e., internal refractive cavity), with surface refractive geometries determined based, at least in part, on a design technique, according to the present disclosure. In an embodiment, the internal refractive geometries are nonplanar. In one nonlimiting example, the surface refractive geometries may be freeform. The design technique may include determining respective refractive geometries of the internal refractive surfaces and, thus, the internal refractive cavity bounded by the internal refractive surfaces. The respective refractive geometries of the internal refractive surfaces may be determined based on a light-energy mapping technique that considers an edge ray principle and Snell's law, as will be described in more detail below.

In an embodiment, a method of designing an internal cavity lens having planar external surfaces, for a selected illumination application may include determining a light energy distribution from an illumination source and an illuminance target, dividing the source light energy distribution into the number of fractional portions, and the illuminance target into the number of illuminance target portions, and determining a geometry of a first internal refractive surface and a geometry of a second internal refractive surface, using a light-energy mapping technique.

In some embodiments, the method may include comparing a simulated illuminance distribution of a simulated internal cavity lens having an internal cavity bounded by internal refractive surfaces having the determined geometries and a target illuminance distribution, and adjusting the number, if the simulated illuminance distribution is not within an allowable tolerance of the target illuminance distribution. If the simulated illuminance distribution is within the allowable tolerance of the target distribution, the optic may be constructed using, for example, 3D manufacturing techniques.

An optic (i.e., lens), according to the present disclosure, that includes an internal cavity (i.e., internal refractive cavity) formed by at least one internal refractive surface and planar (e.g., flat, smooth) external surfaces may reduce or eliminate the reduction in lumen depreciation of the lens caused by the physical environment over time. The planar external surfaces may facilitate assembling LED lighting systems. 3D (i.e., additive) manufacturing techniques may facilitate forming the lens with the internal cavity.

In one nonlimiting example, a design method, according to the present disclosure was validated using the results from a Monte Carlo ray-tracing simulation study and a laboratory experiment that analyzed the output beam of the 3D-printed internal cavity lenses. Tolerance analyses were performed to assess the effects of different design parameters on the beam quality and lens efficiency. Initial ray-tracing results indicated that a lens designed according to the method may provide internal cavity lenses with optical efficiencies of 83% and 80%. Calculated uniformities were 1:1.9 and 1:2.3 during the ray-tracing simulations. The experiment results showed that for the two 3D-printed flat internal cavity lenses that formed the different beam patterns, the optical efficiencies were 72% and 70% and the beam uniformities were 1:2.2 and 1:2.2 with the material and 3D printer used in this study. The lower optical efficiencies in the experimental results may be due to Fresnel and scattering losses related to the 3D-printed lenses.

By way of background, a solid-state lighting system may contain one or more Light-Emitting Diodes (LEDs) and one or more related subsystems. The subsystems may include, for example, optical, thermal, mechanical, electrical, and electronic components. It may be appreciated that in the past two decades, solid-state lighting systems have advanced to outperform traditional lighting technologies in terms of low energy demand and reduced maintenance. The effectiveness of a solid-state lighting system in a given application relies on an optimum design and integration of its sub-components. Lighting applications generally specify a target illuminance level and distribution across an application surface at a relatively low energy consumption. Secondary optics of a light fixture may be configured to facilitate achieving design goals, for example, to control the beam relatively accurately.

Refractive optics may be used in LED systems with transparent geometries on external surfaces to refract light so that the beam can be shaped based on the application. Such lenses accumulate dirt over time due, in part, to exterior surface structures and, as a result, the efficiency of the lighting fixture may be degraded. This results in additional energy usage when compensating for the light output and poses challenges during maintenance to remove the accumulated dirt from the external surface structures. Thus, a refractive optic that includes relatively flat, smooth external surfaces, and internally placed refractive cavities may be configured to reduce or eliminate these challenges.

It may be appreciated that many LED packages have a near-Lambertian distribution with a 120-degree beam angle. Such a configuration may cast a non-uniform circular spot onto the target surface, where light intensity is highest at the center and decays in the radial direction. Secondary optics in an LED light system may be configured to maximize the luminous flux on the application surface. To comply with a relatively low energy consumption goal, secondary optics may be configured to maximize the incident flux onto the target area while achieving the illuminance goals across the application area. A luminaire performance may be determined by both the flux transferred from the source to the target area, and the uniformity of the illuminated area. Thus, a well-defined secondary optic may be configured to achieve a target illumination pattern, optical efficiency, and illuminance uniformity.

Secondary optical systems may use refractive and-or reflective components to shape the beam distribution. In refractive optical systems, surface boundaries between two media with different refractive indices may be used to create lens geometries that shape the beam based on application requirements. Various lens design techniques may be used, configured to achieve optimum lens designs for given applications.

Lens designs that include two internal refractive surface geometries with flat external surfaces can improve the long-term optical efficiency of lighting fixtures. Additionally or alternatively, to reducing dirt accumulation and easing the cleaning process, the planar external lens structure can ease the fixture assembling process. In contrast, using traditional lens fabrication methods can be abortive and inefficient when manufacturing cavity lenses with given internal refractive geometries.

Beam shaping using unusual lens designs may provide a solution to achieve desired beam distributions. Nonetheless, standard lens manufacturing methods became arduous when developing lenses that can generate complex beam patterns. Additive manufacturing, also known as 3D printing, provides flexibility in manufacturing that may facilitate manufacturing relatively unusual lens designs.

A design method, according to the present disclosure, is configured to design internal cavity lens structures for illumination applications. For example, the design method may include a dual freeform internal surface design method based on the light energy mapping design method. Optical 3D printers are used to fabricate the designed lens using the proposed design strategies. Experimental data gathered from the 3D printed lenses are used to validate the proposed simultaneous multiple internal freeform surface design strategies for internal cavity lenses.

In solid-state lighting systems, LEDs are combined with optical, thermal, mechanical, electrical, and other subsystems to use in illumination applications. The subsystems may be designed to achieve relatively higher overall efficiency from an LED lighting system. As an example, the electrical and thermal subsystems are designed to generate a higher LED flux output, and the secondary optical system directs the generated flux to the target area.

As is known, the Illumination Engineering Society of North America (IESNA) provides target distributions for common illuminance shapes in outdoor area lighting. LED lighting systems are configured to shape their output beam distribution based on a selected illumination application. LED lighting systems use secondary optical components to direct photons to maximize luminous flux on application surfaces while maintaining required illumination levels. For example, uniform illuminance in parking lot lighting applications can increase user acceptance of the lighting due to better visibility and higher perception of safety when being in the space. Hence, the optical systems should be designed to maximize the flux transfer from the LED to the illumination application area while achieving illuminance uniformity. Various optical design strategies may be used to accommodate such different beam shaping requirements in lighting applications. It may be appreciated that secondary optics may be designed to redirect the emitted flux from the LED to the target area. In one nonlimiting example, freeform optics may provide benefits including, but not limited to, relatively compact size, relatively accurate beam controlling ability, and a relatively direct design strategy.

In an embodiment, an iterative optimization procedure may be applied to internal spherical cavity parameters to improve efficiency and uniformity for a given illumination application. When designing an optical system for a given application, the intensity distribution of the source [I(θ, ϕ)] and the target illuminance are generally predetermined.

A corresponding design method may then use refractive geometry parameters and relative positioning of internal lens structures to achieve the given target distribution from a given light source. In one nonlimiting example, one or more spherical structures may be arranged in an array to create the internal refractive geometry. However, this disclosure is not limited in this regard. Parameters associated with the spherical structures may include radius of curvature (R) of spherical structure, depth of the spherical structure (h), i.e., portion of sphere, relationship factor between two internal surface structures (k), i.e., relative size, and gap between two internal refractive surfaces.

Depending on application constraints and requirements, optimization of the lens design may include altering selected parameters on internal cavity spherical refractive array lenses to achieve desired the beam distribution. During the optimization procedure, various depths (h) may be used to section spherical structures with different radii of curvatures R to achieve optimal flux efficiency and beam distributions. The symbol d represents cord lengths created by the sectioning of the spherical structures at different depths. The relationship between the parameters of two surface structures (R and h) is defined by variable k. In addition to the change in spherical structure parameters, further optimization can be achieved by changing the gap between two internal surfaces.

An iterative lens design strategy for internal spherical cavity lenses may include three sequential processes: positioning internal lens arrays, optimizing internal spherical array parameters, and determining optimum internal lens gap. The first operation may be configured to attain a desired beam shape through the relative position of two internal lens arrays. Once the initial beam shaping is achieved, the second and third steps may be configured to improve the efficiency and uniformity of the target plane illuminance distribution.

It may be appreciated that an iterative optimization method may be used to determine the lens parameters of internal cavity lens structure with spherical refractive arrays. In one nonlimiting example, the optimization procedure may be used to create a square beam distribution. The same lens design strategy may be used to obtain other beam distributions such as circular, rectangular and square shapes.

Thus, an iterative technique, with spherical structures may be used to design internal refractive structures, according to the present disclosure. In other words, designing internal cavity lenses using spherical geometries may include optimizations of spherical lens array parameters through an iterative process. Based on desired beam pattern, the design process may be initiated by rearranging the internal refractive arrays.

In another embodiment, a direct approach to defining two freeform internal refractive surfaces for illumination targets may be used. The use of freeform lenses may facilitate allowing lighting energy to be redistributed relatively effectively and relatively reliably with a relatively higher uniformity and output efficiency. In one nonlimiting example, freeform refractive surfaces for internal cavity lens structures may be defined. Continuing with this example, an internal freeform surface design method for circular symmetrical beam distribution may be used, according to the present disclosure.

In an embodiment, there is provided an apparatus. The apparatus includes an optic configured for a selected illumination application. The optic includes a first lens structure and a second lens structure. The first lens structure includes a first planar external surface configured to receive incident light, and a first internal nonplanar refractive surface opposing the first planar external surface. The second lens structure includes a second planar external surface configured to emit output light, and a second internal nonplanar refractive surface opposing the second planar external surface. The second planar external surface opposes the first planar external surface. The first internal nonplanar refractive surface and the second internal nonplanar refractive surface define a cavity. The first internal nonplanar refractive surface, the second internal nonplanar refractive surface, and the cavity are positioned between the first planar external surface and the second planar external surface. The first internal nonplanar refractive surface and the second internal nonplanar refractive surface are configured to refract received light to yield emitted light having a target output parameter corresponding to the selected illumination application.

FIG. 1A is a flowchart 100 of operations for designing an internal cavity lens having planar external surfaces, according to various embodiments of the present disclosure. In particular, flowchart 100 illustrates modeling the internal cavity lens based, at least in part, on geometrical optics. The operations may be performed, for example, by an internal cavity lens design system 1102 (e.g., internal cavity lens design circuitry 1104) of FIG. 11, as will be described in more detail below.

Operations of this embodiment may begin with modeling an internal cavity lens at operation 102. In some embodiments, modeling the internal cavity lens may be based, at least in part, on a selected illumination application, and corresponding illumination target. The corresponding target may include, but is not limited to, a circular symmetrical illuminance distribution, a non-circular symmetrical illuminance distribution, etc. Operation 104 includes determining a plurality of surface tangents. A 3D model of a lens structure may be generated based, at least in part, on surface geometric data at operation 106. In some embodiments, light ray(s) may be simulated based, at least in part, on the generated 3D model at operation 108. In some embodiments, the lens structure may be generated, using 3D printing (i.e., additive manufacturing) at operation 110. Thus, an internal cavity lens may be designed based, at least in part, on a light energy mapping technique and using geometrical optics.

Figure 1B:
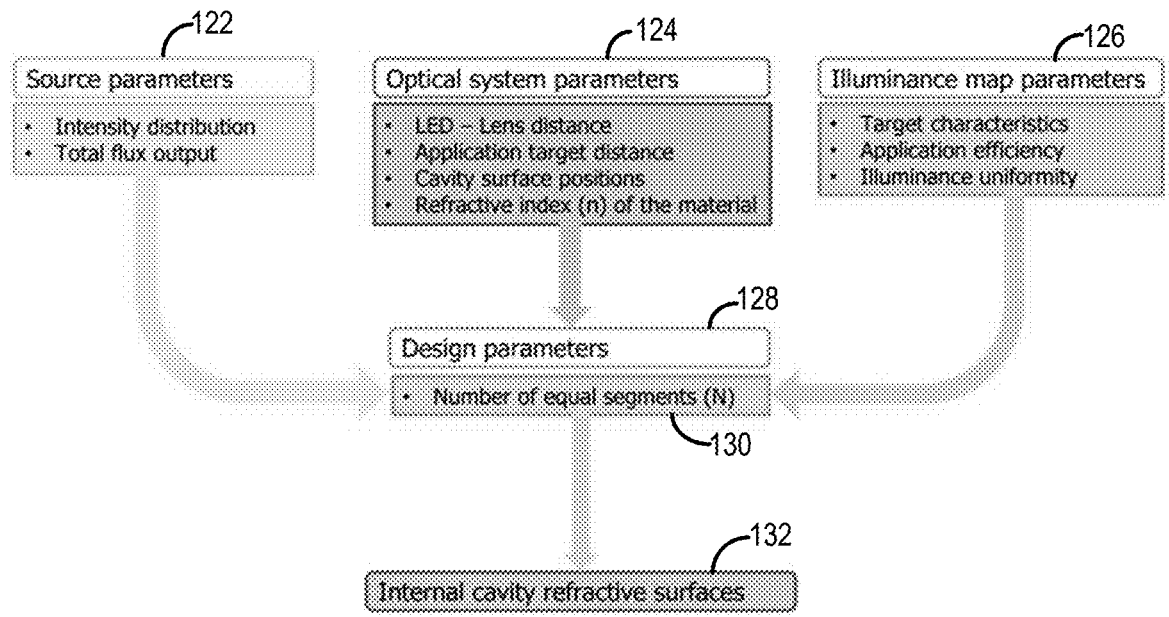
FIG. 1B is a sketch illustrating system parameters that may be used in an internal refractive cavity lens design process, according to various embodiments of the present disclosure.

FIG. 1B is a sketch 120 illustrating system parameters that may be used in an internal refractive cavity lens design process. System parameters may include source parameters 122, optical system parameters 124 and illuminance map parameters 126. Source parameters 122 include intensity distribution and total flux output of a source, e.g., and LED light source. The optical system parameters 124 may include, for example, an LED to lens distance, an application target distance, cavity surface positions, and a refractive index (n) of each material. Illuminance map parameters 126 may include target characteristics, application efficiency, and illuminance uniformity. Design parameters 128 may be determined based, at least in part, on the optical system parameters 124. A number of equal segments (N) 130 may be determined based, at least in part, on the source parameters 122 and the illuminance map parameters 126. Internal cavity refractive surfaces 132 may then be determined based, at least in part, on the parameters and the number of equal segments, as described herein.

In one nonlimiting example of the operations of flowchart 100, a mathematical model may be constructed 102 based on geometrical optics. The surface tangents may then be determined by, for example, system 1100 of FIG. 11, as described herein. In one nonlimiting example, the surface tangent operations may be performed through computation programming using Python™ computer language, available from the Python Software Foundation. After determining the refractive geometry, surface geometry data may then be imported to a 3D modeling platform to create a corresponding Computer-Aided Design (CAD) model. Before the 3D printing of the designed lens structure, LightTools® illumination design software (available from Synopsys® Optical Solutions Group) may be used to conduct ray tracing simulation to observe the output beam distribution. The designed lens structure may then be fabricated using, for example, a Polyjet 3D printing method. Experimental results using the printed lens may then be gathered and compared with corresponding ray tracing simulation results.

Understanding the source characteristics and desired beam distribution may facilitate defining the refractive geometries of the internal cavity lens. An energy ray mapping procedure may be utilized to map internal freeform refractive surfaces. An initial step of the design process may include segmenting (i.e., dividing into a number of fractional portions) the input beam from the light source and target plane to create internal refractive surface geometries of the lens structure. Once the application requirements are identified, mapping of the individual flux segmentation with the respective target plane sections may be performed using an energy mapping method. The edge ray principle and Snell's law may be used to construct energy mapping relationships to obtain the internal refractive geometries of the lens. Thus, the initial process may include dividing source and target into equal fractional portions, i.e., equal flux and area segments, establishing an energy mapping relationship between the light source and target, and constructing freeform surface geometries.

Figure 2A:
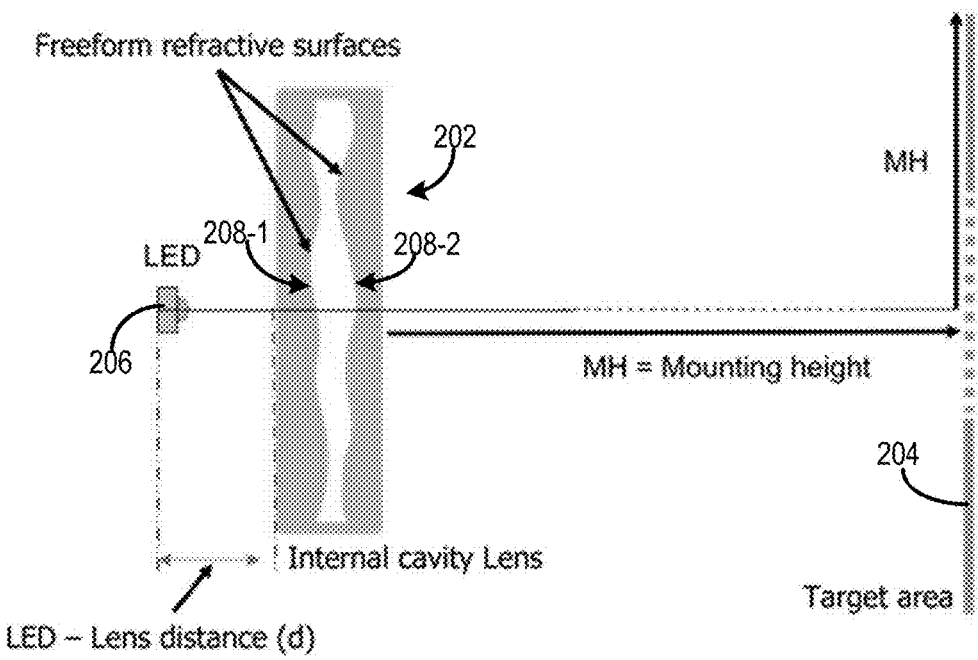
FIG. 2A is a sketch illustrating an optical setup for a freeform internal cavity lens, according to several embodiments of the present disclosure.

FIG. 2A is a sketch 200 illustrating an optical setup for a freeform internal cavity lens, according to several embodiments of the present disclosure. The optical setup 200 includes an internal cavity lens 202, and a target area 204, positioned a mounting height (MH) from the internal cavity lens 202. The optical setup 200 includes a light source 206 (e.g., an LED source), positioned a distance, d, from the internal cavity lens 202. The internal cavity lens includes two freeform refractive surfaces 208-1, 208-2.

Figure 2B:
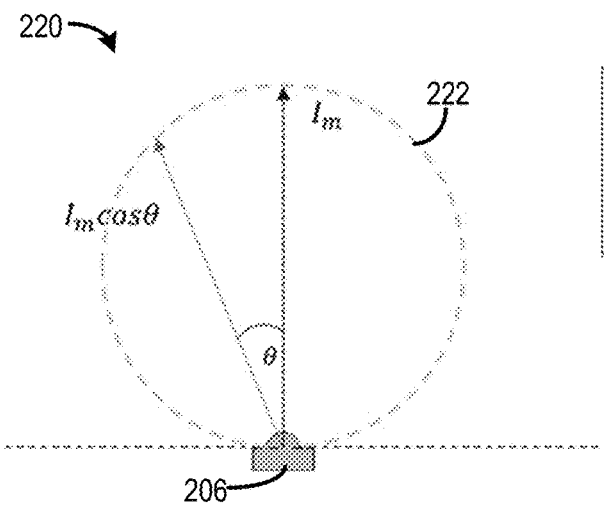
FIG. 2B is a sketch illustrating an LED light source with a Lambertian distribution, according to several embodiments of the present disclosure.
Figure 2C:
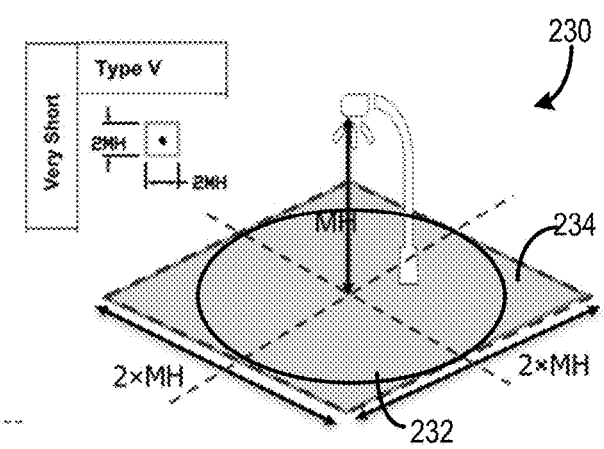
FIG. 2C illustrates two example target application configurations, i.e., illumination targets, according to various embodiments of the present disclosure.

FIG. 2B is a sketch 220 illustrating the LED light source 206 with a Lambertian distribution 222. FIG. 2C illustrates two example target application configurations 230, i.e., illumination targets. Illumination target 230 illustrates a first illumination target having a circular (i.e., rotational symmetric) distribution 232, and a second illumination target having a square (i.e., non-circular, symmetric) distribution 234. Both illumination targets 232, 234 correspond to IESNA type V (i.e., short mounting height (MH)) configurations.

The circular rotational symmetric distribution 232 is considered first. The source light energy distribution 222 may be divided into a number of fractional portions, and the illumination target 232 may be divided into the number of illumination target portions. In this example, the fractional portions correspond to equal flux segments and equal area segments. Thus, in this example, an LED source with Lambertian distribution may be configured to provide a type V beam distribution as the target output beam pattern. The lens design approach, according to the present disclosure suggests sending equal flux segmentation from the source to the equally divided area on the target plane to achieve uniform illumination distribution at the given target plane. As the illuminance is defined by the ratio of flux and area, this approach may create an illuminance map with a uniform distribution of illuminance.

The LED light source output may then be divided into equal flux grids. Initially the total flux output $\phi_{total}$ of the selected source is divided into N number of equal unit light energy grids of $\phi_i$. Where the relationship between $\phi_{total}$ and $\phi_i$ are defined as:

$$\phi_i = \frac{\phi_{total}}{N} \quad (6.1)$$

An edge ray principle includes identifying the rays that section these segments of equal flux in order to construct an energy mapping relationship. When the intensity distribution of the source is given by $I(\theta)$, and $d\omega$ is a respective solid angle for each flux segment, ray angles for each equal luminous flux of $\phi_i$ may be determined as:

$$\phi_i = \int I(\theta) d\omega \quad (6.2)$$

Figure 3B:
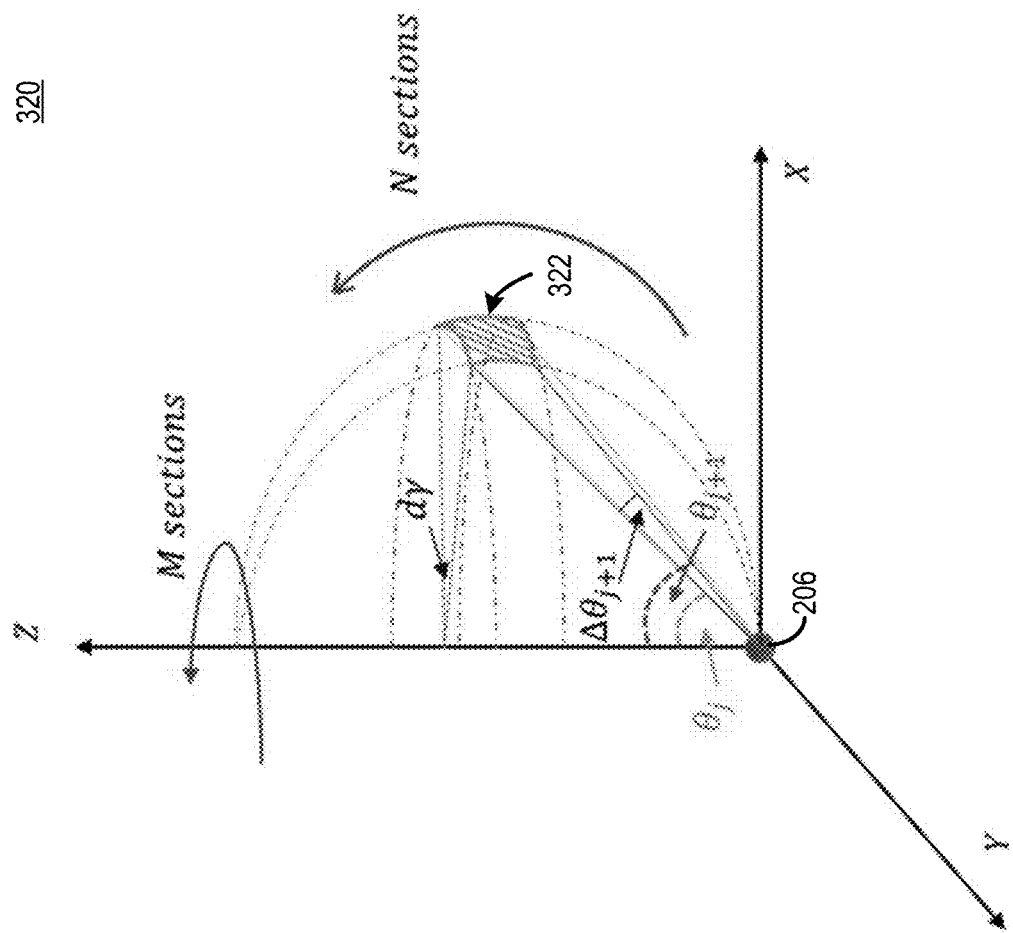
FIGS. 3A and 3B are plots illustrating equivalent flux segments for light energy distributions corresponding to a rotational symmetric distribution, and a square distribution, respectively.
Figure 3A:
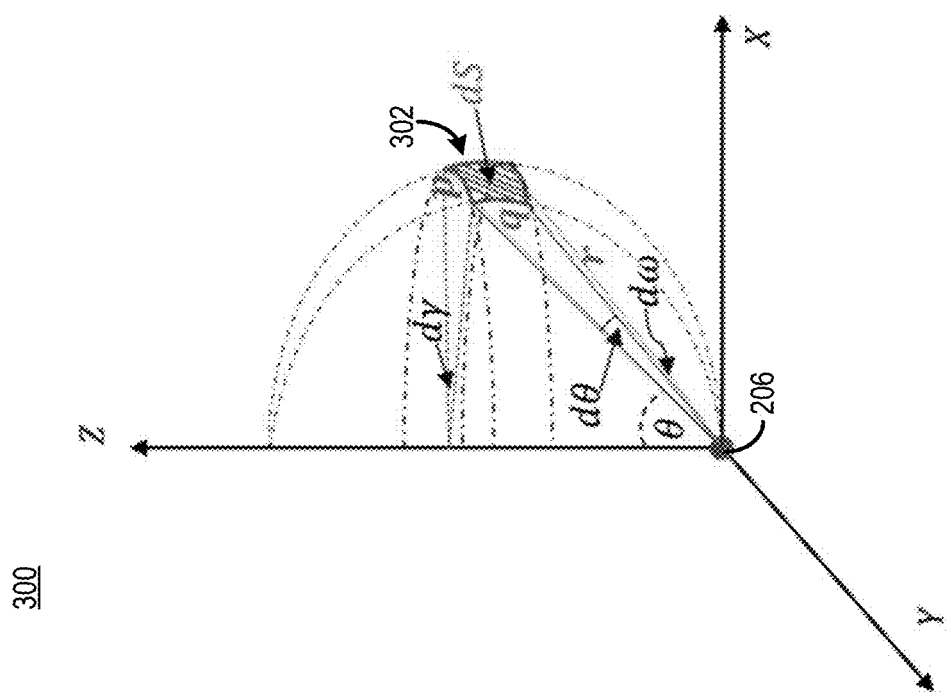

FIGS. 3A and 3B are plots 300, 320 illustrating equivalent flux segments for light energy distributions 302, 322 corresponding to a rotational symmetric distribution 232, and a square distribution 234, respectively. Turning first to FIG. 3A, a solid angle, $d\omega$, creates a small surface area $dS$ at $r$ distance away from the LED position. Using a definition of the solid angle, the relationship among the area $dS$ and radius $r$ and the solid angle can be written as:

$$d\omega = \frac{dS}{r^2} \quad (6.3)$$

It may be appreciated that dimensions of the small area dS, p and q, can be written using the polar coordinates γ, θ and r as:

$$p = r\sin\theta d\gamma \qquad (6.4)$$

$$q = rd\theta \qquad (6.5)$$

Using the calculated dimension, dS in the equation 6.3 may be substituted to obtain an expression for dw as:

$$d\omega = \frac{pq}{r^2} = \frac{r^2\sin\theta d\gamma d\theta}{r^2} = \sin\theta d\gamma d\theta \qquad (6.6)$$

To perform integral based on polar coordinate angles, dw may be substituted into the equation 6.2 as:

$$\phi_i = \int I(\theta)d\omega = \int_{\gamma_1}^{\gamma_2} d\gamma \int_{\theta_1}^{\theta_2} I(\theta)\sin\theta d\theta \qquad (6.7)$$

Since the initial design method is considering a circular symmetric beam distribution, equal flux ring segments may be utilized where $\gamma_1$ and $\gamma_2$ expand from 0 to $2\pi$ radians as:

$$\phi_i = \int I(\theta)d\omega = \int_{\theta}^{2\pi} d\gamma \int_{\theta_1}^{\theta_2} I(\theta)\sin\theta d\theta \qquad (6.8)$$

$$\phi_i = 2\pi \int_{\theta_1}^{\theta_2} I(\theta)\sin\theta d\theta \qquad (6.9)$$

When calculating the total flux of the of an LED source, $\theta_1$ and $\theta_2$ may expand from 0 to $\pi/2$ radians as:

$$\phi_{total} = 2\pi \int_0^{\pi/2} I(\theta)\sin\theta d\theta \qquad (6.10)$$

For N equal grids of flux divided segments, the expression can be written as:

$$2\pi \int_{\theta_i}^{\theta_{i+1}} I(\theta)\sin\theta d\theta = \frac{2\pi}{N} \int_0^{\pi/2} I(\theta)\sin\theta d\theta \qquad (6.11)$$

As given in the equation 6.11, the equal flux grids may be represented by the flux emitting region bounded by $\theta_i$ and $\theta_{i+1}$. Hence, the $\Delta\theta_{i+1}$ represents angular sections that emit equal amounts of flux from the LED source, where each $\theta_i$ defines the angles to divide total flux into equal flux areas. In equation form:

$$\Delta\theta_{i+1} = \theta_{i+1} - \theta_i (i = 0, 1, 2 \ldots, N-1) \qquad (6.12)$$

Finding angles that divide LED source with Lambertian distribution into equal flux grids may be determined as:

$$2\pi \int_{\theta_i}^{\theta_{i+1}} I(\theta)\sin\theta d\theta = \frac{\phi_{total}}{N} \qquad (6.13)$$

For Lambertian source $I(\theta) = I\cos(\theta)$, thus:

$$2\pi \int_{\theta_i}^{\theta_{i+1}} I\cos\theta\sin\theta d\theta = \frac{\phi_{total}}{N} \qquad (6.14)$$

$$\pi I \int_{\theta_i}^{\theta_{i+1}} \sin 2\theta d\theta = \frac{\phi_{total}}{N} \qquad (6.15)$$

$$\left[\frac{-\cos 2\theta}{2}\right]_{\theta_i}^{\theta_{i+1}} = \frac{\phi_{total}}{\pi IN} \qquad (6.16)$$

$$\cos 2\theta_i - \cos 2\theta_{i+1} = \frac{2\phi_{total}}{\pi IN} \qquad (6.17)$$

$$\theta_{i+1} = \frac{1}{2}\cos^{-1}\left[\cos 2\theta_i - \frac{2\phi_{total}}{\pi IN}\right] \qquad (6.18)$$

It may be appreciated that the total flux of an LED source with Lambertian distribution can be written as $\phi_{total} = \pi I$. Hence, the relationship between $\theta_i$ and $\theta_{i+1}$ can be written as:

$$\theta_{i+1} = \frac{1}{2}\cos^1\left[\cos 2\theta_i - \frac{2}{N}\right] \text{ for } (i = 0, 1, 2 \ldots, N-1) \qquad (6.19)$$

During the process, initial $\theta_i$ started with the angle of 0 and $\theta_{i+1}$ determined with the solution determined from the integral given in the equation 6.19. Later the spatial illuminance distribution of the LED source may be divided by calculated emitting angle $\theta_i$.

Figure 4:
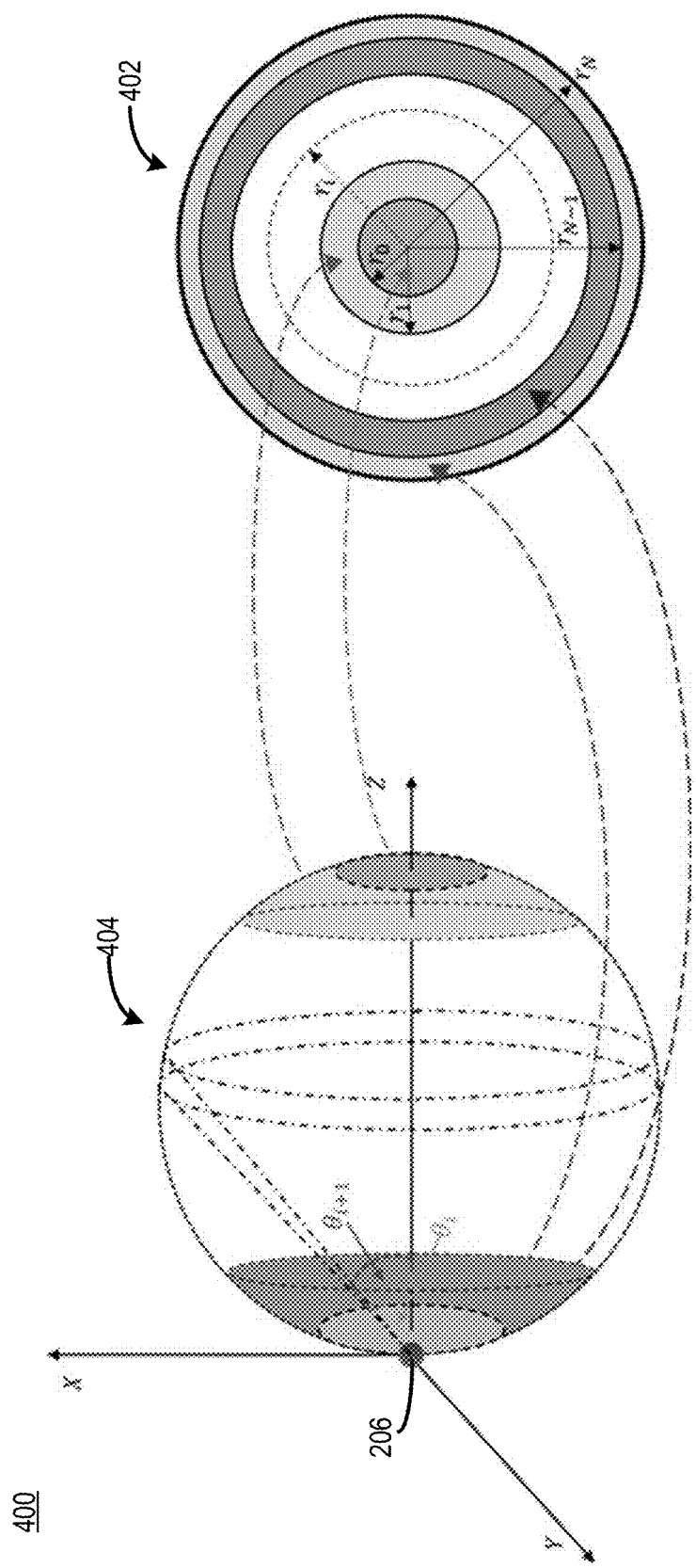
FIG. 4 is a sketch illustrating energy mapping between the Lambertian distribution of a light source and the target application of FIGS. 2B and 2C, respectively.

FIG. 4 is a sketch 400 illustrating energy mapping between the Lambertian distribution 222 of light source 206 and the target application 232 of FIGS. 2B and 2C, respectively. Sketch 400 includes a rotational symmetric target 402 divided for equal area segments and the Lambertian distribution 404. The circular target area 232 (e.g., rotational symmetric target 402) may be divided into equal area grids. It may be appreciated that the equal area grids for a circular target area are annular, corresponding to a plurality of annular grid areas. Thus, the circular target area may be divided into N equal area annulus grid areas with a radius of $r_i$ (i=0, 1, 2 . . . , N−1, $r_0$=0). Each equal target area $S_0$ may be calculated as:

$$S_0 = \pi r_{i+1}^2 - \pi r_i^2 = \frac{\pi R^2}{N} \ (i = 0, 1, 2 \ldots, N-1, r_0 = 0) \qquad (6.20)$$

$r_i$ for equal annulus areas may then be calculated as:

$$r_i = R\sqrt{\frac{i}{N}} \ (i = 0, 1, 2 \ldots, N) \qquad (6.21)$$

As illustrated in FIG. 4, this process is configured to allow obtaining individual $r_i$ values that divide the target plane into equal area grids. Using the calculated $r_i$, this design method is configured to determine the incident point coordinates of each edge ray on the target plane.

After dividing the LED source into equal flux areas and the target plane into equal area segments, a next operation may include the method of establishing the ray mapping relationship. During this process, the ray emitted from the source at the angle of $\theta_i$ and $\theta_{i+1}$ is configured to reach the target plane positions of $r_i$ and $r_{i+1}$, respectively. Based on the edge ray principle, flux in between may then illuminate the annulus area between the $r_i$ and $r_{i+1}$, as illustrated in FIG. 4.

A secondary optical system may be configured to direct rays emitted from the source at angle $\theta_i$ to the target plane positions of $r_i$. In an embodiment, a design strategy may include designing a lens structure with two internal freeform lens geometries with planar exterior surfaces. Snell's law may then be used to determine sections of surface geometries needed to map the respective ray to the selected incident points on the target map.

Figure 5:
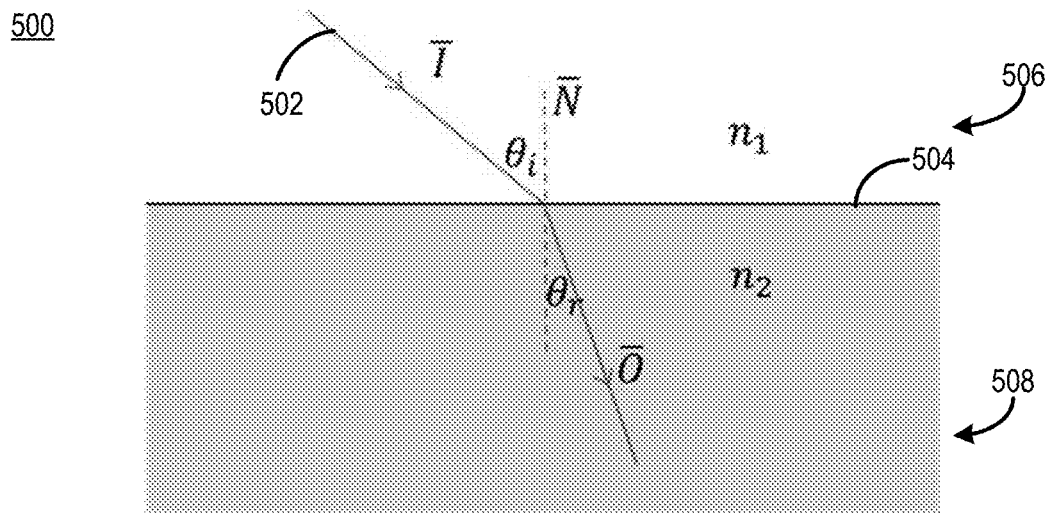
FIG. 5 is a sketch illustrating refraction of a light ray at an interface of optically different media.

FIG. 5 is a sketch 500 illustrating refraction of a light ray 502 at an interface 504 of optically different media 506, 508. Geometrical optics-based theoretical equations may then be used to determine surface geometries of freeform internal surfaces. The vectorized geometrical optical equations may then be derived. As an initial step, the vectorized representation of the refractive optical system may be determined using Snell's law. Snell's law may be stated in the following form where $n_1$ and $n_2$ are refractive indexes of the two different mediums and $\theta_i$ and $\theta_r$ are the angle of incidence and angle of refraction, respectively.

$$n_1 \sin \theta_i = n_2 \sin \theta_r \qquad (6.22)$$

To write the above equation 6.22 in vector form, the unit vectors of the incident and refracted the ray vector may be considered. Surface normal at the point of refraction may be denoted as $\vec{N}$ normal unit vectors. Initially, the cross product of $\vec{I}$ and $\vec{N}$ may be determined to develop relationships among vector components as:

$$\vec{I} \times \vec{N} = |\vec{I}||\vec{N}| \sin(180 - \theta_i) \hat{P} \qquad (6.23)$$

Since $\vec{I}$ and $\vec{N}$ are unit vectors, the cross product may be written as:

$$\vec{I} \times \vec{N} = \sin(\theta_i) \hat{P} \qquad (6.24)$$

Similarly, it is possible to obtain the following relationship for the refracted ray:

$$\vec{O} \times \vec{N} = \sin(\theta_r) \hat{P} \qquad (6.25)$$

Using equations 6.22, 6.24 and 6.25, yields:

$$n_1 \frac{\vec{I} \times \vec{N}}{\hat{P}} = n_2 \frac{\vec{O} \times \vec{N}}{\hat{P}} \qquad (6.26)$$

Hence, Snell's law in vector form can be written as:

$$n_1 (\vec{I} \times \vec{N}) = n_2 (\vec{O} \times \vec{N}) \qquad (6.27)$$

When $n = n_1/n_2$, Snell's law can be rewritten as:

$$n(\vec{I} \times \vec{N}) = (\vec{O} \times \vec{N}) \qquad (6.28)$$

It may be appreciated that the Snell's law representation in equation 6.28 may not be the most convenient way to determine refracted ray path.

Figure 6:
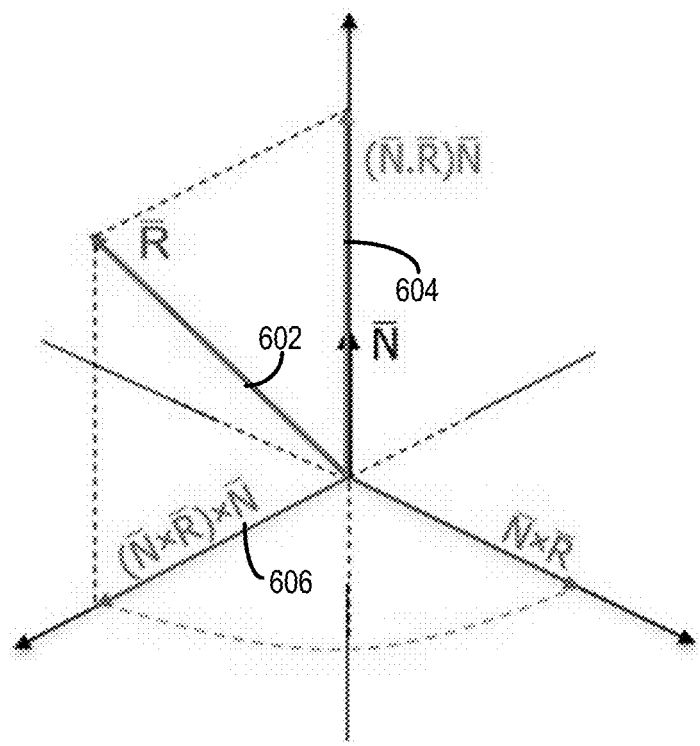
FIG. 6 is a sketch illustrating decomposing a vector into two components, according to various embodiments of the present disclosure.

FIG. 6 is a sketch 600 illustrating decomposing a vector 602 into two components. Hence, a simplified version of equation 6.28 may be obtained to determine the refracted ray when incident ray, normal vector, and incident ray paths are given as given in FIG. 6, for unit vector $\vec{N}$, and any given vector $\vec{R}$ components with respect to the axis $\vec{N}$ as:

$$\vec{R} = \vec{R}_\| + \vec{R}_\perp \qquad (6.29)$$

$$\vec{R}_\| = (\vec{N} \cdot \vec{R}) \vec{N} \qquad (6.30)$$

$$\vec{R}_\perp = (\vec{N} \times \vec{R}) \times \vec{N} \qquad (6.31)$$

Using Triple vector product:

$$(\vec{N} \times \vec{R}) \times \vec{N} = \vec{R} - (\vec{N} \cdot \vec{R}) \vec{N} \qquad (6.32)$$

$$\vec{R}_\perp = \vec{R} - (\vec{N} \cdot \vec{R}) \vec{N} \qquad (6.33)$$

$$\vec{R} = (\vec{N} \cdot \vec{R}) \vec{N} + (\vec{N} \times \vec{R}) \times \vec{N} \qquad (6.34)$$

Using the above representation, incident and refracted rays can be written using the normal vector at the incident plane as:

$$\vec{O} = (\vec{N} \cdot \vec{O}) \vec{N} + (\vec{N} \times \vec{O}) \times \vec{N} \qquad (6.35)$$

$$\vec{I} = (\vec{N} \cdot \vec{I}) \vec{N} + (\vec{N} \times \vec{I}) \times \vec{N} \qquad (6.36)$$

Using equations 6.28 and 6.35:

$$\vec{O} = (\vec{N} \cdot \vec{O}) \vec{N} + n(\vec{N} \times \vec{I}) \times \vec{N} \qquad (6.37)$$

Using equations 6.36 and 6.37:

$$\vec{O} = (\vec{N} \cdot \vec{O}) \vec{N} + n[\vec{I} - (\vec{N} \cdot \vec{I}) \vec{N}] \qquad (6.38)$$

$(\vec{N} \cdot \vec{O})\vec{N}$ and $\vec{I} - (\vec{N} \cdot \vec{I})\vec{N}$ are normal to each other, thus, taking the norms of equation 6.38 yields:

$$\|\vec{O}\|^2 = (\vec{N} \cdot \vec{O})^2 \|\vec{N}\|^2 + n^2 \|(\vec{I} - (\vec{N} \cdot \vec{I}) \vec{N})\|^2 \qquad (6.39)$$

$$1 = (\vec{N} \cdot \vec{O})^2 + n^2 (1 - (\vec{N} \cdot \vec{I})^2) \qquad (6.40)$$

$$(\vec{N} \cdot \vec{O}) = \pm \sqrt{1 - n^2 [1 - (\vec{N} \cdot \vec{I})^2]} \qquad (6.41)$$

Since the angle between $\vec{I}$ and $\vec{O}$ are between 0 and $\pi/2$, the negative solution may be neglected. Using equations 6.38 and 6.41:

$$\vec{O} = \sqrt{1 - n^2\left[1 - \left(\vec{N}\cdot\vec{I}\right)^2\right]}\vec{N} + n\left[\vec{I} - \left(\vec{N}\cdot\vec{I}\right)\vec{N}\right] \quad (6.42)$$

Similarly, a vectorized equation for incident ray also can be obtained where refracted ray path and normal vectors are known:

$$\vec{I} = \sqrt{1 - \frac{1}{n^2}\left[1 - \left(\vec{N}\cdot\vec{O}\right)^2\right]}\vec{N} + \frac{1}{n}\left[\vec{O} - \left(\vec{N}\cdot\vec{O}\right)\vec{N}\right] \quad (6.43)$$

To define the freeform surface geometries, this design approach is configured to determine the tangent of the surface for each ray passing through the two internal refractive surfaces. These tangents may be determined based on the normal vectors defined by the target refraction at each surface. Therefore, the normal vector $\vec{N}$ at the refraction surface may be determined where the incident ray $\vec{I}$ and refracted ray $\vec{O}$ are known. Considering equation 6.28:

$$n\left(\vec{I} \times \vec{N}\right) = \left(\vec{O} \times \vec{N}\right) \quad (6.44)$$

$$\vec{O} \times \vec{N} - n\,\vec{I} \times \vec{N} = 0 \quad (6.45)$$

$$\left(\vec{O} - n\,\vec{I}\right) \times \vec{N} = 0 \quad (6.46)$$

For the cross product of two non-zero vectors to be zero, two vectors may be parallel to each other. Using the constant $\lambda$, two vectors can be rewritten as:

$$\left(\vec{O} - n\,\vec{I}\right) = \lambda\vec{N} \quad (6.47)$$

To find the value for $\lambda$, $$\left(\vec{O} - n\,\vec{I}\right)^2 = \left(\lambda\vec{N}\right)^2 \quad (6.48)$$

$$1 - 2n\left(\vec{O}\cdot\vec{I}\right) + n^2 = \lambda^2 \quad (6.49)$$

$$\lambda = \sqrt{1 + n^2 - 2n\left(\vec{O}\cdot\vec{I}\right)} \quad (6.50)$$

Using equations 6.47 and 6.50:

$$\vec{O} - n\,\vec{I} = \sqrt{1 + n^2 - 2n\left(\vec{O}\cdot\vec{I}\right)}\,\vec{N} \quad (6.51)$$

$$\vec{N} = \frac{\vec{O} - n\,\vec{I}}{\sqrt{1 + n^2 - 2n\left(\vec{O}\cdot\vec{I}\right)}} \quad (6.52)$$

Thus, a refracted ray may be determined when incident ray and the surface normal are given, using Equation 6.42. An incident ray may be determined when refracted ray and the surface normal are given, using Equation 6.43. A surface normal may be determined when incident ray and the refracted ray are given, using Equation 6.52.

Using the determined relationships, the design method, according to the present disclosure is configured to map ray emitting from the source at angle $\theta_i$ to the target plane positions of $r_i$. During the mapping process, the target refraction at freeform lenses may determine a respective surface normal for each ray emitting at $\theta_i$ angle. Using these surface normals, surface tangents can be determined for two internal freeform lenses.

Figure 7:
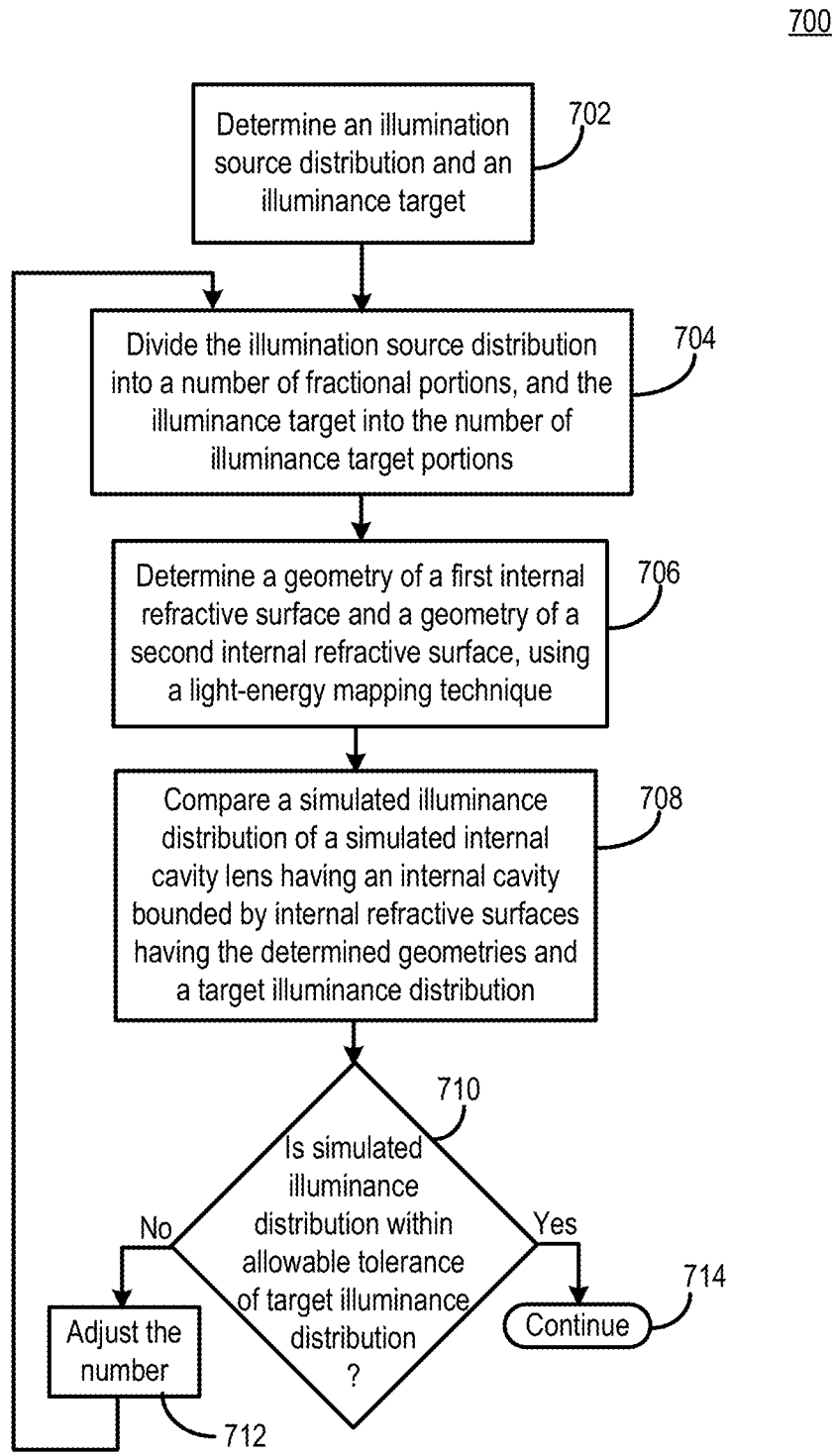
FIG. 7 is a flowchart of operations for designing an internal cavity lens having planar external surfaces, according to various embodiments of the present disclosure.

FIG. 7 is a flowchart 700 of operations for designing an internal cavity lens having planar external surfaces, according to various embodiments of the present disclosure. In particular, flowchart 700 illustrates determining a geometry of a first internal refractive surface and a geometry of a second internal refractive surface, using a light-energy mapping technique. The operations may be performed, for example, by an internal cavity lens design system 1102 (e.g., internal cavity lens design circuitry 1104) of FIG. 11.

Operations of this embodiment may begin with determining a light energy distribution from an illumination source (i.e., illumination source distribution) and an illuminance target at operation 702. Operation 704 includes dividing the illumination source distribution into a number of fractional portions, and the illuminance target into the number of illuminance target portions. Operation 706 may include determining a geometry of a first internal refractive surface and a geometry of a second internal refractive surface, using a light-energy mapping technique. A simulated illuminance distribution of a simulated internal cavity lens having an internal cavity bounded by internal refractive surfaces having the determined geometries and a target illuminance distribution may be compared at operation 708. Whether the simulated illuminance distribution is within allowable tolerance of target illuminance distribution may be determined at operation 710. If the simulated illuminance distribution is not within allowable tolerance of target illuminance distribution, the number may be adjusted at operation 712, and program flow may proceed to operation 704. If the simulated illuminance distribution is within allowable tolerance of target illuminance distribution, program flow may continue at operation 714. Thus, a geometry of a first internal refractive surface and a geometry of a second internal refractive surface may be determined, using a light-energy mapping technique.

Figure 8:
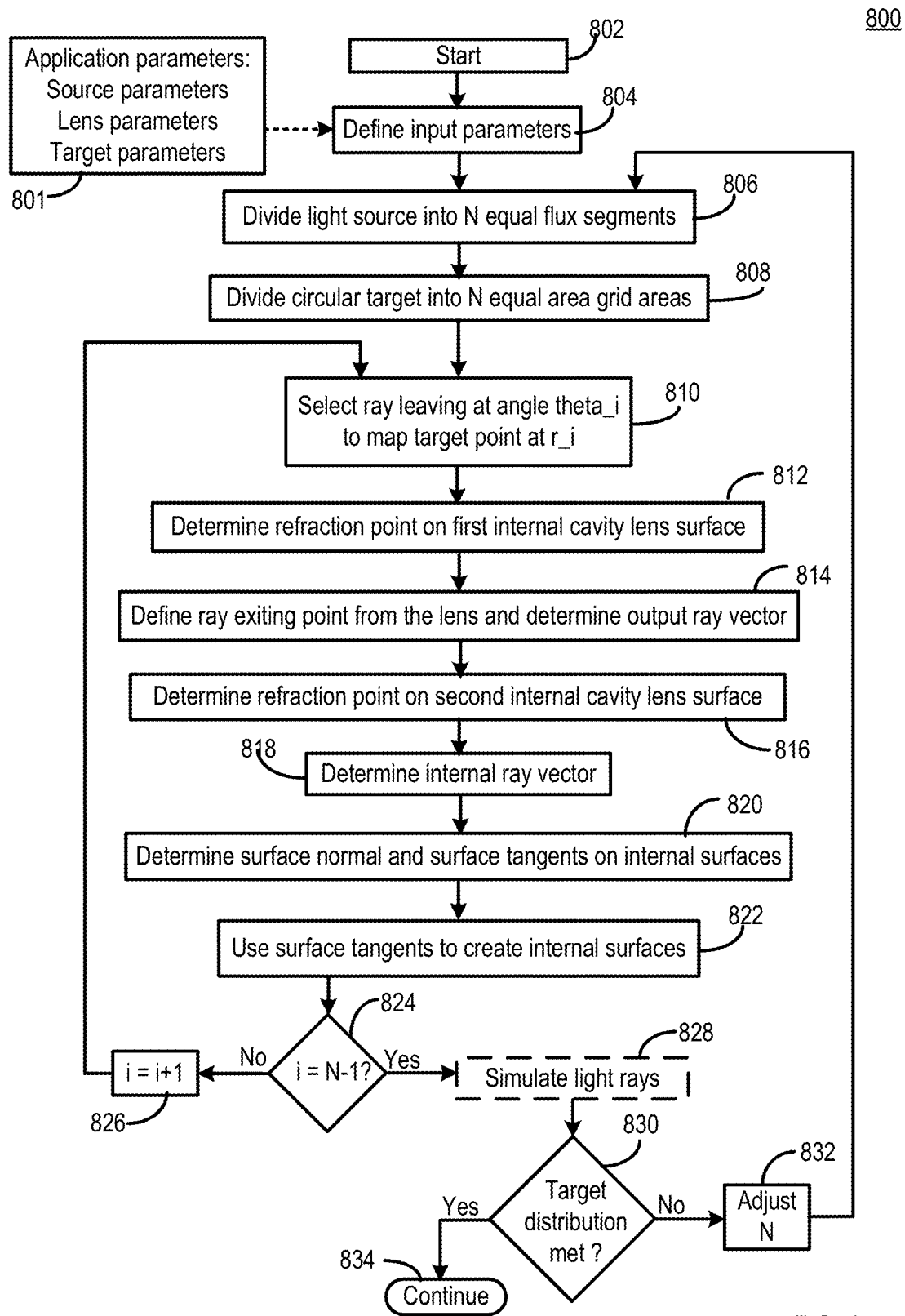
FIG. 8 is a flowchart of operations for designing an internal cavity lens having planar external surfaces, according to various embodiments of the present disclosure.

FIG. 8 is a flowchart 800 of operations for designing an internal cavity lens having planar external surfaces, according to various embodiments of the present disclosure. In particular, flowchart 800 illustrates determining a geometry of a freeform internal cavity lens for a circular symmetrical illuminance distribution, using a light-energy mapping technique. The operations may be performed, for example, by an internal cavity lens design system 1102 (e.g., internal cavity lens design circuitry 1104) of FIG. 11.

Operations of this embodiment may start at operation 802. Operation 804 includes defining input parameters. The input parameters may be defined based, at least in part, on one or more application parameter(s). Application parameters 801 may include one or more source parameters, one or more lens parameters, and one or more target parameters. A light source may be divided into a number, N, equal flux segments at operation 806. A circular target may be divided into the number, N, equal area grid areas at operation 808. Operation 810 includes selecting a ray leaving at angle $\theta_i$ to map target point at $r_i$. Operation 812 includes determining a refraction point on a first internal cavity lens surface. Operation 814 includes defining a ray exiting point from the lens and determining output ray vector. Operation 816 includes determining a refraction point on a second internal cavity lens surface. Operation 818 includes determining an internal ray vector. Operation 820 includes determining a surface normal and surface tangents on internal surfaces. Operation 822 includes using surface tangents to create internal surfaces.

Whether i=N−1 (i.e., whether an index equals the number, N, minus one) may be determined at operation 824. If i does not equal N−1, i may be incremented by one (i=i+1) and program flow may proceed to 810. If i equals N−1, light rays may be simulated at operation 828. Whether a target distribution is met may be determined at operation 830. If the target distribution is not met, the number, N, may be adjusted at operation 832, and program flow may proceed to operation 806. If target distribution is met, program flow may continue at operation 834.

Thus, a geometry of a freeform internal cavity lens for circular symmetrical illuminance distribution may be determined, using a light-energy mapping technique.

In one nonlimiting example, corresponding to flowchart 800, a freeform internal cavity lens for circular symmetrical illuminance distribution may be constructed. Operations (i.e., steps) include:

Step 1: Start
Step 2: Define source and lens parameters.
  1. Source parameters may include:
     (a) Source position: $P_0=(x_0, y_0, z_0)$
     (b) Intensity distribution: $I(\theta)$
  2. Lens parameters may include:
     (a) Outer planar surface equations
     (b) Lens dimensions
Step 3: Define target plane parameters.
  1. Target plane dimensions (if circular—Radius (R) and Center)
  2. Target plane equation
Step 4: Divide light source into equal flux segments.
  1. Define a number of equal flux segments. −(N)
  2. Calculate $\theta_i$ angles dividing equal flux segments. (i=0, 1, 2, ..., N−1)
Step 5: Divide circular target area into equal grid areas.
Step 6: Calculate first incident ray vector ($\vec{I_0}$) for angle $\theta_i$.
Step 7: Use Snell's law (equation.6.42) with the first surface normal vector and $\vec{I_0}$ to calculate the refracted ray vector ($\vec{I_1}$) from the 1st planar surface.
Step 8: Define the first internal thickness ($t_1$) and determine the refraction point ($P_2$) on the first internal cavity lens surface.
Step 9: Define ray exiting point ($P_4$) on the second planar surface of the lens. The coordinate of the point ($P_4$) may be defined after considering $P_2$ for feasible refraction through the air lens. In one nonlimiting example, an offset variable $$\left(\frac{4 \times \text{Radius}}{N \times \text{iteration}}\right)$$

to determine the ray leaving point from the lens structure.

Step 10: Calculate output ray vector ($\vec{O_2}$) from the lens using point $P_4$ and point calculate on target plane ($P_5$) for equal surface areas.
Step 11: Use Snell's law (equation.6.43) with second surface normal vector and $\vec{O_2}$ to calculate the incident ray vector ($\vec{O_1}$) on the 2nd planar surface.
Step 12: Define the second internal thickness ($t_2$). Determine the second refraction point ($P_3$) of air lens using $\vec{O_1}$ and the thickness $t_2$.
Step 13: Using points $P_2$ and $P_3$, calculate internal ray vector $\vec{O_0}$
Step 14: Use equation 6.52 to calculate surface normals at the first ($\vec{N_1}$) and second ($\vec{N_2}$) air lens refraction points. Then use $\vec{N_1}$ and $\vec{N_2}$ to determine the tangent surface at point $P_2$ and $P_3$.
Step 15: Repeat step 6-14 for each $\theta_i$ and obtain lines defining the surface profiles. Later revolve lines through the center axis to define the final lens model.
Step 16: Assess the output beam distribution and compare it with the desired beam pattern. If the output is unable to meet requirements, adjust N and repeat steps 3-16.
Step 17: End It may be appreciated that a surface tangent for each segmentation may be determined by a computational program using, for example, the programming language Python 3.10. The tangent vector values for lens surfaces may be extracted.

Turning now to FIGS. 2B and 2C, the second illumination target has a square (i.e., non-circular, symmetric) distribution 234. A method of designing an internal cavity lens having planar external surfaces, for a selected illumination application, when the illumination target has a non-circular symmetric distribution has some commonality with the circular symmetric distribution, as described herein, but also has some differences. It may be appreciated that while the freeform technique, as will be described in more detail below, is configured for a square beam pattern, the same approach can be used to develop other shapes such as rectangles and hexagons, within the scope of the present disclosure.

The source light energy distribution 222 may be divided into a number of fractional portions, and the illumination target 234 may be divided into the number of illumination target portions. In contrast to the circular symmetric design method, as described herein, the non-circular symmetric design method may be configured to utilize axial symmetries on target and source distribution to simplify the calculations. With the corresponding flux segmentation and area segmentation, the energy mapping method may be used to map the individual flux segments to the respective target plane sections. Determined surface tangents may then be used to construct the freeform surface geometries.

The source light energy distribution 222 may be divided into a number of fractional portions, and the illumination target 234 may be divided into the number of illumination target portions. In this example, the fractional portions correspond to equal flux segment and equal area segments. Thus, equal segments of flux for the source and equal segments of area for the target may be created.

The design method is configured to develop an internal cavity lens structure to obtain a non-circular symmetric target with uniform illuminance distribution. Similar to the circular symmetric example, as described herein, an LED source 206 with Lambertian distribution 222 is used to provide the type V square 234 beam pattern as the target output beam pattern. The lens design approach, according to the present disclosure suggests sending equal flux segmentation from the source to the equally divided area on the target plane to achieve uniform illuminance distribution at the given target plane. Different from the circularly symmetric configuration and considering the axial symmetry of the square target plane and the Lambertian beam distribution of the source, in an embodiment, the design method may be configured to determine a one-quarter section of the source light energy distribution and corresponding illumination target distribution.

At least a portion of the LED light source output may then be divided into equal flux grids. For example, and based, at least in part, on axial symmetry of the LED source, one-quarter of the light source is considered for dividing into equal flux segments. Turning now to FIG. 3B, equivalent flux segments for light energy distribution 322 corresponds to the square target plane 234 of FIG. 2C. Based on a projected mapping to the target plane, the light energy distribution may be divided into M×N grids of equal flux segments. Following equation 6.7, a luminous flux $\phi_i$ between the angles $d\gamma$ and $d\omega$ can be represented as:

$$\phi_i = \int I(\theta) d\omega = \int_{\gamma 1}^{\gamma 2} d\gamma \int_{\theta 1}^{\theta 2} I(\theta) \sin\theta d\theta \quad (7.1)$$

Since this design method uses a portion, e.g., one-quarter, of the optical system, $\gamma_1$ and $\gamma_2$ may expand from 0 to $\pi/2$ radians as:

$$\phi_{total} = \int_0^{\pi/2} d\gamma \int_{\theta 1}^{\theta 2} I(\theta) \sin\theta d\theta \quad (7.2)$$

To calculate the total flux of an LED source $\theta_1$ and $\theta_2$ may expand from 0 to $\pi/2$ radians. Therefore, the total flux in one-quarter of the source distribution can be represented as:

$$\phi_{total} = \frac{\pi}{2} \int_0^{\pi/2} I(\theta) \sin\theta d\theta \quad (7.3)$$

Total flux emitted in the one-quarter region may first be divided into M equal segments along the latitudinal direction. Flux on each of these segments may then be equal to $\phi_{total}/M$. Next, each of these $\phi_{total}/M$ flux segments may be divided along the longitudinal direction. Division along the longitudinal direction may be performed using the $\Delta\theta_{j+1}$ angular sections based on the intensity distribution of the LED source. After divisions in both latitudinal and longitudinal directions, expression for the flux on each equal flux segment $\phi_{total}/NM$ can be written as:

$$\frac{\pi}{2M} \int_{\theta_j}^{\theta_{j+1}} I(\theta) \sin\theta d\theta = \frac{\pi}{2MN} \int_0^{\pi/2} I(\theta) \sin\theta d\theta = \frac{\phi_{total}}{MN} \quad (7.4)$$

Equation 7.4 is configured to provide the equal flux amount bounded by $\theta_j$ and $\theta_{j+1}$, where each $\theta_j$ defines the angles to divide total flux into equal flux sections:

$$\Delta\theta_{j+1} = \theta_{j+1} - \theta_j (j = 0, 1, 2, \ldots, N-1) \quad (7.5)$$

Using the equation 7.4, the following operations may be performed to identify the angles that divide the LED source having Lambertian distribution into equal flux grids. For Lambertian source $I(\theta) = I \cos(\theta)$, $$\frac{\pi}{2M} \int_{\theta_j}^{\theta_{j+1}} I \cos\theta \sin\theta d\theta = \frac{\phi_{total}}{MN} \quad (7.6)$$

$$\frac{\pi I}{4M} \int_{\theta_j}^{\theta_{j+1}} \sin 2\theta d\theta = \frac{\phi_{total}}{MN} \quad (7.7)$$

$$\left[\frac{-\cos 2\theta}{2}\right]_{\theta_j}^{\theta_{j+1}} = \frac{4\phi_{total}}{\pi IN} \quad (7.8)$$

$$\cos 2\theta_j - \cos 2\theta_{j+1} = \frac{8\phi_{total}}{\pi IN} \quad (7.9)$$

$$\theta_{j+1} = \frac{1}{2} \cos^{-1}\left[\cos 2\theta_j - \frac{8\phi_{total}}{\pi IN}\right] \quad (7.10)$$

The total flux of an LED source with Lambertian distribution can be written as: $\phi_{total} = \pi I$. Thus, a relationship between $\theta_j$ and $\theta_{j+1}$ can be written as:

$$\theta_{j+1} = \frac{1}{2} \cos^{-1}\left[\cos 2\theta_j - \frac{8}{N}\right] \text{ for } (j = 0, 1, 2, \ldots, N-1) \quad (7.11)$$

When determining $\theta_{j+1}$ values, it may be appreciated that the initial $\theta_j$ starts with the 0 and the respective $\theta_{j+1}$ may be determined from the integral given in the equation 7.11. Later the determined emitting angle $\theta_j$ may be used to divide the spatial illuminance distribution of the LED source.

Figure 9A:
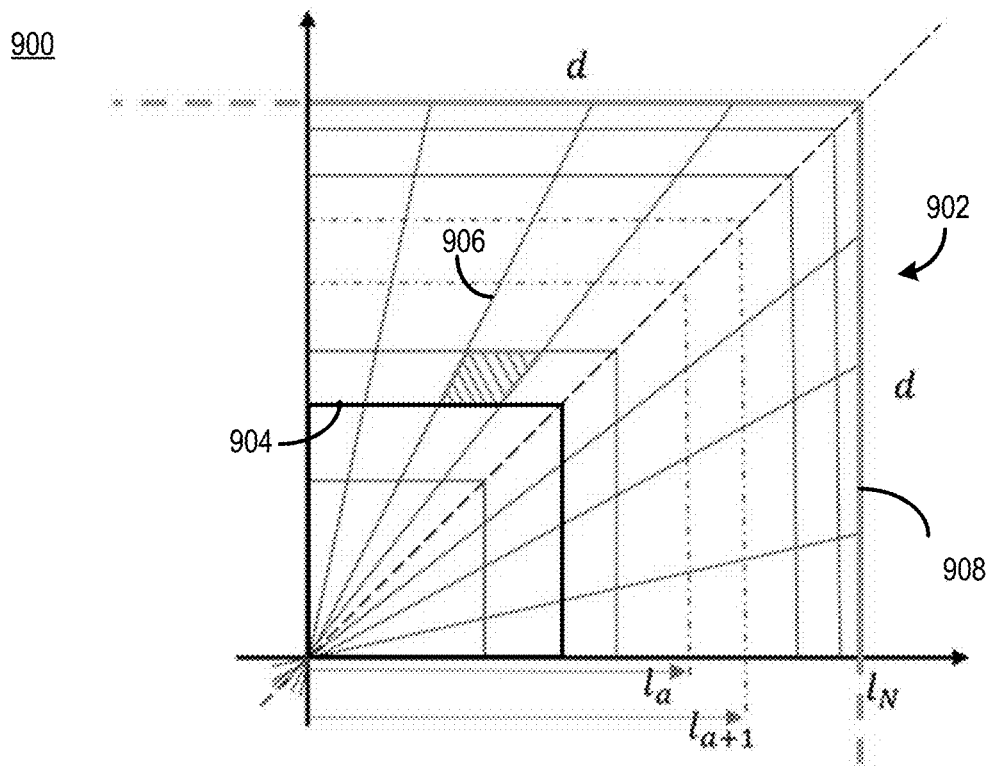
FIG. 9A is a sketch illustrating equivalent area segments of a non-circular symmetrical area for light energy distribution.

FIG. 9A is a sketch 900 illustrating equivalent area segments of a non-circular symmetrical area for light energy distribution. Sketch 900 is configured to graphically illustrate a target area division technique for non-circular symmetric target illumination. Initially, a square target area 902 may be divided into N equal segments using squares, e.g., square 904. The target plane 902 may then be equally divided using the M−1 radial lines, e.g., radial line 906. Radial lines may be distributed configured to equally divide the edges, e.g., edge 908, of the target plane 902. This division method is configured to create the equal M×N segments in one-quarter of the target area. Divided segments may then be used to establish the energy mapping relationship with the source flux segments.

Assuming the total area of one-quarter of the target area is A, the area of each equal area segmentation by the initial square division can be written as:

$$A_a = \frac{A}{N} \quad (7.12)$$

For example, if the lengths of the two adjacent squares are $l_a$ and $l_{a+1}$, initial area section $A_a$ can be rewritten as:

$$A_a = \frac{A}{N} = l_{a+1}^2 - l_a^2 \quad (7.13)$$

The coordinates of the target divisions may then be calculated in order to apply the edge ray principle with the source origin position and the target positions. Each rectangular division coordinate can be calculated using the derived equation as:

$$l_a = \sqrt{l_{a+1}^2 - \frac{A}{N}} \text{ for } (a = 0, 1, 2, \ldots, N-1) \quad (7.14)$$

An intersection of M−1 radial sub-divisions and the rectangular sections may be determined, configured to map the respective equal flux segments to the equal area section on the square target plane.

Figure 9B:
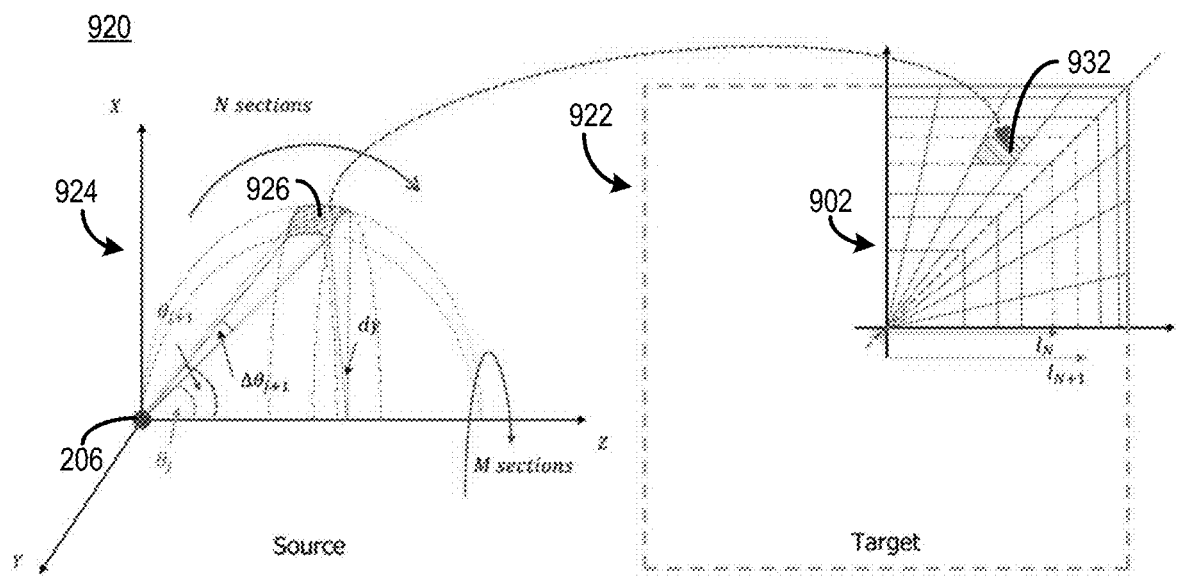
FIG. 9B is a sketch illustrating energy mapping between the Lambertian distribution of light source and the target application of FIGS. 2B and 2C, respectively.

FIG. 9B is a sketch 920 illustrating energy mapping between the Lambertian distribution 222 of light source 206 and the target application 234 of FIGS. 2B and 2C, respectively. The target application 234 corresponds to the target for a non-circular symmetric target distribution. Sketch 920 includes a non-circular symmetric target 922 that includes a square target area 902 that corresponds to a portion (e.g., one-fourth) of the target 922. Sketch 900 further includes a portion 924 of the source Lambertian distribution illustrating a fractional portion (i.e., equal flux segment) 926 of the source light energy distribution. The fractional portion 926 may map to a corresponding fractional portion (i.e., equal area segment) 932 of the square target area 902.

The design strategy is configured to design a lens structure with two internal freeform lens geometries with planar exterior surfaces. Snell's law will be used to determine the sections of surface geometries that may be used to map the respective ray to the desired incident points on the target map.

The same surface construction method used to create the curve in the circular symmetric lens design method is used to construct curves along the longitudinal direction. However, due to the change in target point locations with each ray along the latitudinal direction, normal vectors along the longitudinal direction may be determined for each latitudinal section. During this design strategy, the surface curvature along the latitudinal direction is determined based on respective longitudinal curve points.

Figure 10:
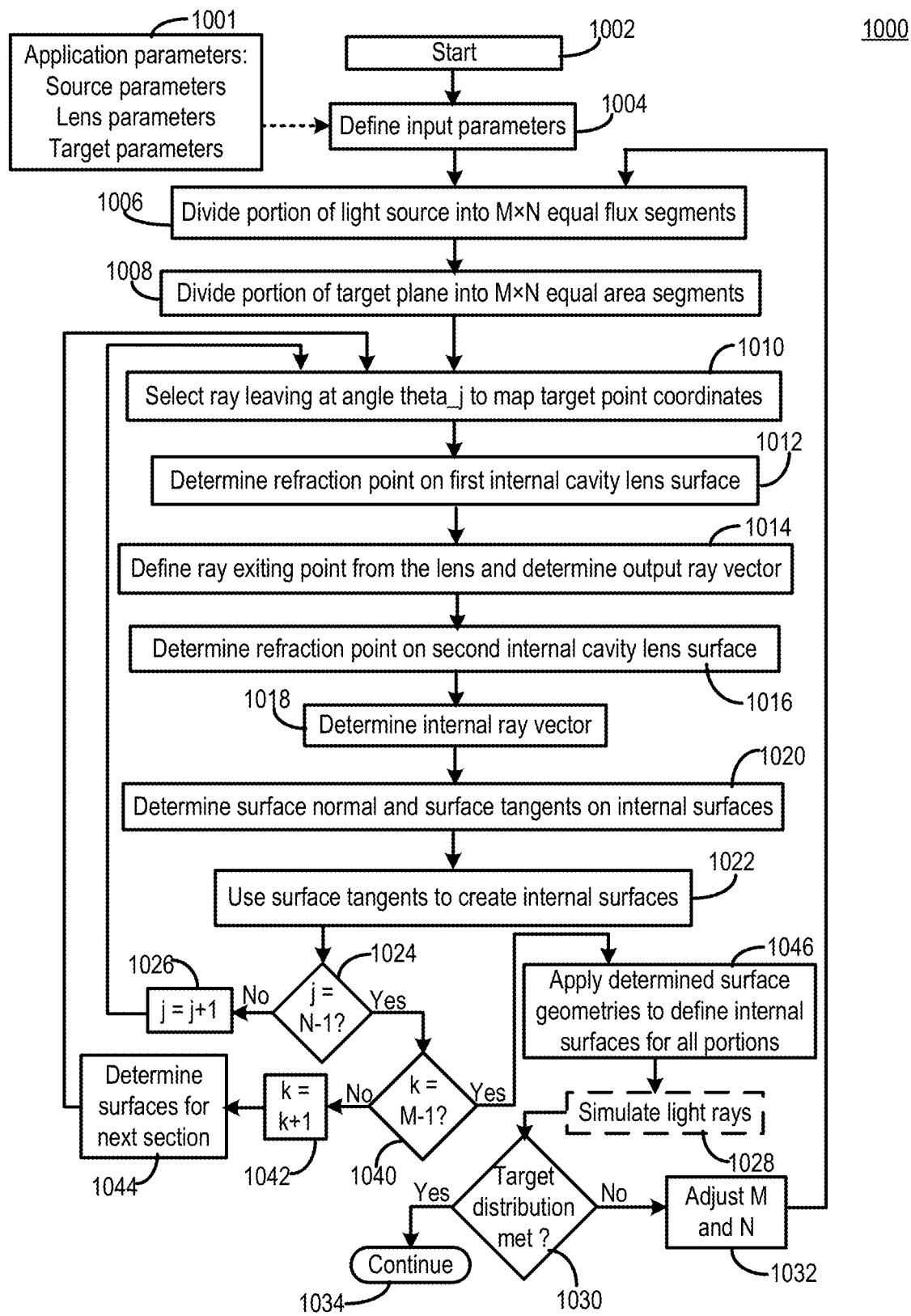
FIG. 10 is a flowchart of operations for designing an internal cavity lens having planar external surfaces, according to various embodiments of the present disclosure.

FIG. 10 is a flowchart 1000 of operations for designing an internal cavity lens having planar external surfaces, according to various embodiments of the present disclosure. In particular, flowchart 1000 illustrates determining a geometry of a freeform internal cavity lens for a non-circular symmetrical illuminance distribution, using a light-energy mapping technique. The operations may be performed, for example, by an internal cavity lens design system 1102 (e.g., internal cavity lens design circuitry 1104) of FIG. 11.

Operations of this embodiment may start at operation 1002. Operation 1004 includes defining input parameters. The input parameters may be defined based, at least in part, on one or more application parameter(s). Application parameters may include one or more source parameters, one or more lens parameters, and one or more target parameters. A portion of a light source may be divided into a number, M×N, equal flux segments at operation 1006. A portion of a target plane may be divided into the number, M×N, equal area segments at operation 1008. Operation 1010 includes selecting a ray leaving at angle $\theta_j$ to map target point coordinates. Operation 1012 includes determining a refraction point on a first internal cavity lens surface. Operation 1014 includes defining a ray exiting point from the lens and determining output ray vector. Operation 1016 includes determining a refraction point on a second internal cavity lens surface. Operation 1018 includes determining an internal ray vector. Operation 1020 includes determining a surface normal and surface tangents on internal surfaces. Operation 1022 includes using surface tangents to create internal surfaces.

Whether j=N−1 (i.e., whether index j equals the number, N, minus one) may be determined at operation 1024. If j does not equal N−1, j may be incremented by one (j=j+1) and program flow may proceed to 1010. If j equals N−1, whether k=M−1 may be determined at operation 1040. If k does not equal M−1, k may be incremented by one (k=k+1) at operation 1042. Surfaces for a next section may be determined at operation 1044. Program flow may then proceed to 1010. If k equals M−1, determined surface geometries may be applied to define internal surfaces for all portions at operation 1046. Light rays may then be simulated at operation 1028. Whether a target distribution is met may be determined at operation 1030. If the target distribution is not met, the number, M×N, may be adjusted at operation 1032, and program flow may proceed to operation 1006. If target distribution is met, program flow may continue at operation 1034.

Thus, a geometry of a freeform internal cavity lens for non-circular symmetrical illuminance distribution may be determined, using a light-energy mapping technique.

In one nonlimiting example, corresponding to flowchart 1000, a freeform internal cavity lens for a non-circular symmetrical illuminance distribution may be constructed. Operations (e.g., steps) include:

Step 1: Start

Step 2: Define lens system parameters.
  1. Source parameters
    (a) Source position:−$P_0$=($x_0$, $y_0$, $z_0$)
    (b) Intensity distribution:−$I(\theta)$
  2. Lens parameters
    (a) Outer planar surface equations
    (b) Lens dimensions Step 3: Define target plane parameters.
  1. Target plane dimensions (if a square-side length)
  2. Target plane position
  3. Target plane equation Step 4: Divide one-quarter of the light source into M×N grids of equal flux
  1. Divide one-quarter light source into equal flux segments along the latitudinal direction. −(M)
  2. Divide source sections into equal flux segments along the longitudinal direction. −(N)
  3. Calculate $\theta_j$ angles dividing equal flux segments along the longitudinal direction. (j=0, 1, 2, . . . , N−1)

Step 5: Divide the square target area into equal grid areas.
  1. Divide one-quarter of the target plane into N equal segments using rectangles.
  2. Use M−1 radial lines to further divide the target plane into equal area sections.

Step 6: Calculate first incident ray vector ($\vec{I_0}$) for angel $\theta_j$ along longitudinal direction.

Step 7: Use Snell's law (equation.6.42) with the first surface normal vector and $\vec{I_0}$ to calculate the refracted ray vector ($\vec{I_1}$) from the 1st planar surface.

Step 8: Define the first internal thickness ($t_1$) and determine the refraction point ($P_2$) on the first internal cavity lens surface.

Step 9: Define ray exiting point ($P_4$) on the second planar surface of the lens. The coordinate of the $P_4$ should be defined after considering $P_2$ for feasible refraction through the air lens.

Step 10: Calculate output ray vector ($\vec{O_2}$) form the lens using point $P_4$ and point calculate on target plane ($P_5$) for equal surface areas.

Step 11: Use Snell's law (equation.6.43) with second surface normal vector and $\vec{O_2}$ to calculate the incident ray vector ($\vec{O_1}$) on the 2nd planar surface.

Step 12: Define the second internal thickness ($t_2$). Determine the second refraction point ($P_3$) of the air lens using $\vec{O_1}$ and the thickness $t_2$ Step 13: Using points $P_2$ and $P_3$, calculate internal ray vector $\vec{O_0}$ Step 14: Use equation.6.52 to calculate surface normals at the first ($\vec{N_1}$) and second ($\vec{N_2}$) air lens refraction points. Then use $\vec{N_1}$ and $\vec{N_2}$ determine the tangent surface at point $P_2$ and $P_3$.

Step 15: Repeat step 6-14 for each $\theta_j$ and obtain two internal surface lines along the longitudinal direction.

Step 16: Repeat steps 6-15 for each latitudinal section for one-quarter of the light energy distribution.

Step 17: Use respective calculated longitudinal points to define the surface geometry of the internal surfaces along the latitudinal direction.

Step 18: Mirror the calculated surface geometries and define the two internal surfaces on all four quadrants.

Step 19: Assess the output beam distribution and compare it with the desired beam pattern. If the output is unable to meet requirements, change N, and M values and repeat steps 3-18.

Step 20: End

It may be appreciated that a surface tangent for each segmentation may be determined by a computational program using, for example, the programming language Python 3.10. The tangent vector values for lens surfaces may be extracted.

Figure 11:
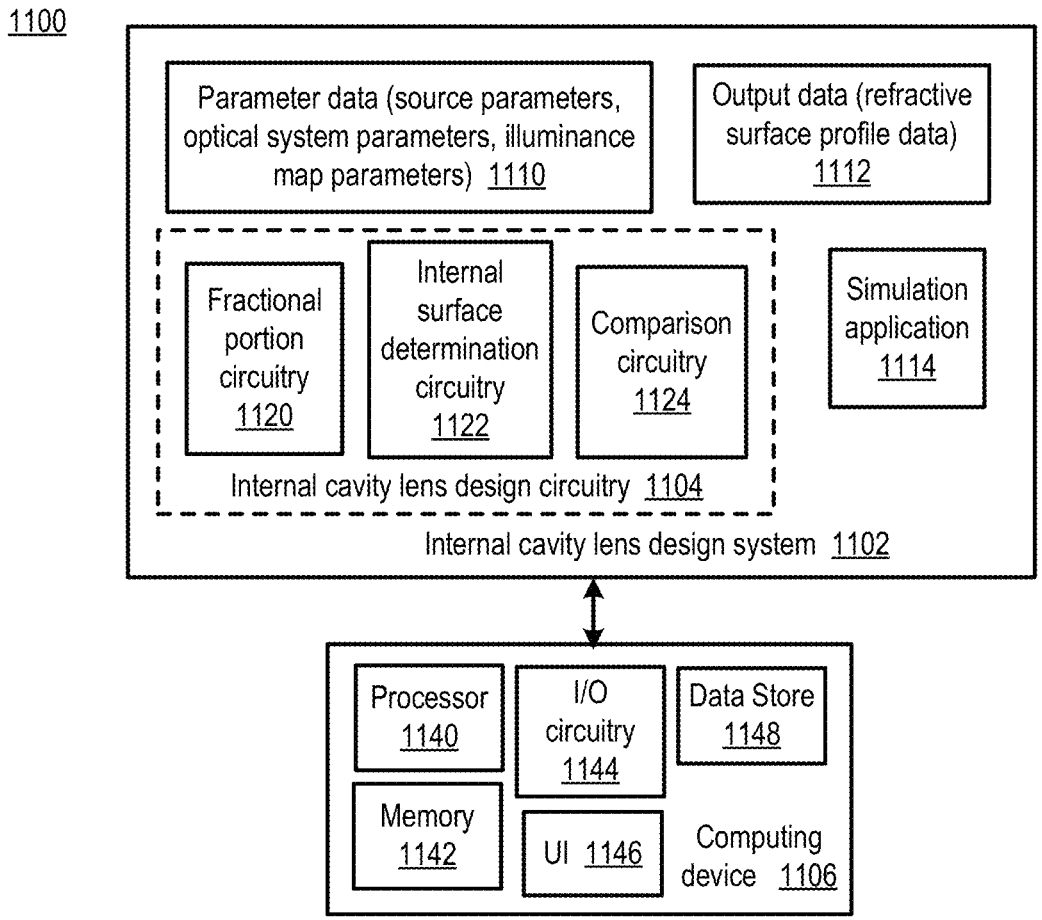
FIG. 11 illustrates a functional block diagram of a system that includes an internal cavity lens design system, according to several embodiments of the present disclosure.

FIG. 11 illustrates a functional block diagram 1100 of a system that includes an internal cavity lens design system 1102, according to several embodiments of the present disclosure. System 1100 may further include a computing device 1106. Internal cavity lens design system 1102 includes an internal cavity lens design circuitry 1104, and may include parameter data 1110, output data (i.e., refractive surface profile data) 1112, and a simulation application 1114.

In one nonlimiting example, the internal cavity lens design circuitry 1104 may include a fractional portion circuitry 1120, an internal surface determination circuitry 1122, and/or a comparison circuitry 1124.

Computing device 1106 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 1106 includes a processor 1140, a memory 1142, input/output (I/O) circuitry 1144, a user interface (UI) 1146, and data store 1148.

Processor 1140 is configured to perform operations of internal cavity lens design system 1102, including, for example, the fractional portion circuitry 1120, the internal surface determination circuitry 1122, and/or the comparison circuitry 1124. Processor 1140 may be further configured to perform operations of the simulation application 1114. Memory 1142 may be configured to store data associated with internal cavity lens design circuitry 1104, and/or simulation application 1114. I/O circuitry 1144 may be configured to provide wired and/or wireless communication functionality for internal cavity lens design system 1102. For example, I/O circuitry 1144 may be configured to receive parameter data 1110 (including, e.g., source parameters, optical system parameters, and/or illuminance parameters). UI 1146 may include a user input device (e.g., keyboard, mouse, microphone, touch sensitive display, etc.) and/or a user output device, e.g., a display. Data store 1148 may be configured to store one or more of parameter data 1110, output data 1112, and/or other data associated with internal cavity lens design circuitry 1104, and/or simulation application 1114.

The operation of internal cavity lens design system 1102 may be best understood when considered in combination with FIG. 7. In operation, internal cavity lens design system 1102 is configured to automate designing an internal cavity lens, as described herein.

The system 1100 that includes the internal cavity lens design system is configured to design an internal cavity lens having planar external surfaces, for a selected illumination application. Internal cavity lens circuitry 1104, e.g., fractional portion circuitry 1120, is configured to determine an illumination source distribution and an illuminance target. The illumination source distribution and an illuminance target may be determined based, at least in part, on parameter data 1110, including, for example, one or more of source parameters, optical system parameters, and/or illuminance map parameters. The fractional portion circuitry 1120 is configured to divide the illumination source distribution into a number of fractional portions, and the illuminance target into the number of illuminance target portions. The internal surface determination circuitry 1122 is configured to determine a geometry of a first internal refractive surface and a geometry of a second internal refractive surface, using a light-energy mapping technique. The geometries of the internal refractive surface may be determined incrementally for each of the number of fractional portions.

In some embodiments, the comparison circuitry 1124 may be configured to compare a designed internal cavity lens to a simulated internal cavity lens. In one nonlimiting example, the simulated internal cavity lens may be produced by simulation application 1114. The internal cavity lenses may be configured to contain an internal cavity bounded by internal refractive surfaces having the determined geometries and a target illuminance distribution. In some embodiments, the fractional portion circuitry 1120 may be configured to adjust the number, if the simulated illuminance distribution is not within an allowable tolerance of the target illuminance distribution.

Thus, an internal cavity lens design system 1102, including an internal cavity lens design circuitry 1104, according to the present disclosure, may be configured to design an internal cavity lens having planar external surfaces, for a selected illumination application.

Generally, this disclosure relates to a lens, in particular to, a 3D printed internal cavity lens for lighting applications. An apparatus, system, and/or method, according to the present disclosure, is configured to provide a design strategy and a design technique for producing an optic configured for a selected illumination application. The optic includes a first lens structure and a second lens structure. The optic is configured to receive input light from an LED lighting source, and to yield emitted light having a target beam distribution corresponding to a selected illumination application. The optic is configured to refract the received light with internal refractive surfaces that define a cavity (i.e., internal refractive cavity), with surface refractive geometries determined based, at least in part, on a design technique, according to the present disclosure. In an embodiment, the internal refractive geometries are nonplanar. In one nonlimiting example, the surface refractive geometries may be freeform. The design technique may include determining respective refractive geometries of the internal refractive surfaces and, thus, the internal refractive cavity bounded by the internal refractive surfaces. The respective refractive geometries of the internal refractive surfaces may be determined based on a light-energy mapping technique that considers an edge ray principle and Snell's law, as will be described in more detail below.

In an embodiment, a method of designing an internal cavity lens having planar external surfaces, for a selected illumination application may include determining a light energy distribution from an illumination source and an illuminance target, dividing the source light energy distribution into the number of fractional portions, and the illuminance target into the number of illuminance target portions, and determining a geometry of a first internal refractive surface and a geometry of a second internal refractive surface, using a light-energy mapping technique.

Figure 12A:
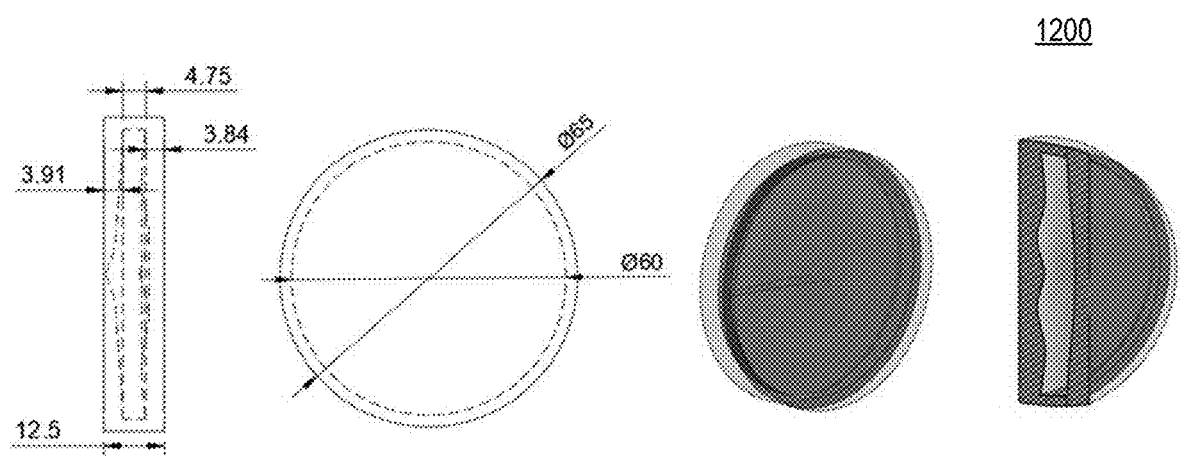
FIGS. 12A and 12B are 3D CAD (computer-aided drafting) renderings of 3D freeform internal cavity lenses, generated, as described herein.
Figure 12B:
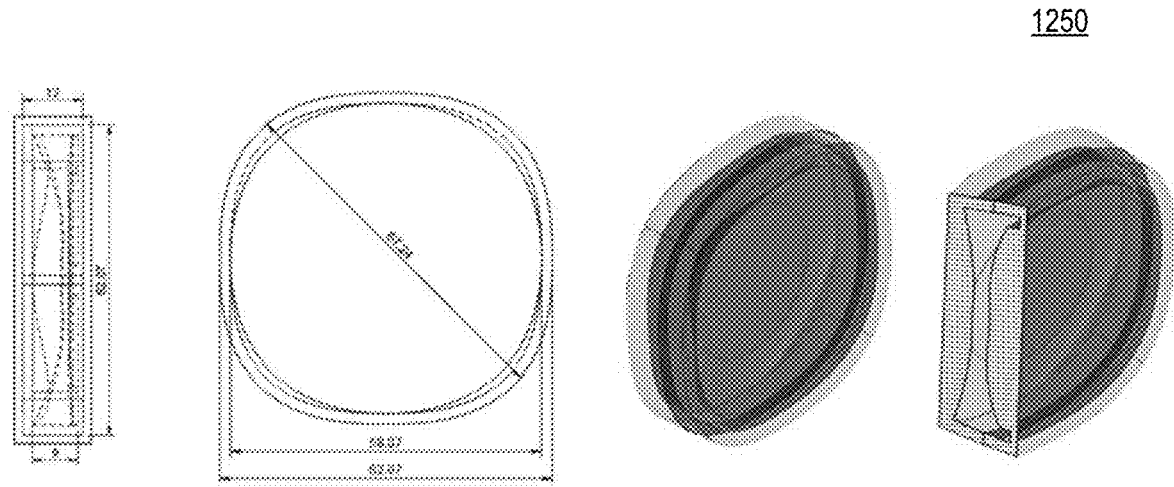

FIGS. 12A and 12B are 3D CAD (computer-aided drafting) renderings 1200, 1250 of 3D freeform internal cavity lenses, generated, as described herein. Rendering 1200 corresponds to the circular symmetric configuration and rendering 1250 corresponds to the non-circular symmetric configuration.

A computer program developed based on the proposed freeform lens design algorithm is configured to provide coordinate points on the freeform lenses and respective surface tangents at each point. These values may be extracted to the 3D modeling program to create a surface spline using the coordinate points and tangent values. Considering the rotational symmetry, the developed 2D cross-sectional geometry is revolved 360 degrees to create a 3D internal freeform lens structure.

Once the 3D CAD model for the internal cavity lens is designed, the next step may use an optical ray-tracing software, e.g., LightTools®, to conduct Monte Carlo ray simulations under the initial application setup. During the ray tracing simulation, a Cree XLamp XP-E LED with near Lambertian distribution was used as the LED source. The total flux output from the LED was set to 100 lm at a beam angle of 120 degrees. Optical losses, including Fresnel losses were neglected during the initial ray tracing.

The illuminance map created from the optical system may be extracted using the LightTools ray-tracing software. After analyzing the results gathered from the ray tracing simulations, it may be observed that the freeform internal cavity lens was able to achieve the projected illuminance distribution of circular symmetrical illuminance distribution with a 300 mm radius.

To assess the performance of the optical design, the efficiency of the optical system may be calculated as the ratio between the flux received by the first surface of the lens to the flux captured at the target plane. Calculation confirmed that the proposed design method was able to achieve 83.2% efficiency at the target plane for the circular symmetric distribution, and 80.4% for the non-circular symmetric distribution. To understand the illuminance distribution across the target plane, a uniformity ratio on the target plane was determined. Uniformity is defined as the ratio between the maximum illuminance value on the target plane to the minimum illuminance value found inside the illuminated perimeter. For this given application, the optical system was able to achieve a max:min uniformity ratio of 1.9:1 for the circular symmetric distribution, and 2.3:1 for the non-circular symmetric distribution.

Gathered results from the ray tracing simulations provide evidence that the freeform internal cavity lens design for circular symmetric or non-circular symmetric configurations using the proposed method was able to achieve desired illuminance distribution with higher efficiency and uniformity.

Using the design strategy for freeform internal cavity lenses according to the present disclosure, a lens may be defined configured to achieve a target output beam distribution with relatively higher efficiency and uniformity. It may be appreciated that, fabricating lenses with internal refractive surfaces is a challenging task with conventional manufacturing methods. Additionally or alternatively, additive manufacturing techniques may be utilized to fabricate the designed lens structure.

In one nonlimiting example, a multijet 3D printing method was used to fabricate the designed lens structures. During the multijet 3D printing process, the printing heads of the printer apply Ultra-Violet (UV) curable transparent resin droplets and level with a roller to create a single layer. Then the UV light is used to cure the layered material before the next layer of droplets. If overhanging structures are present in the model, printed use the support materials to build around building materials. This support material can be later removed from the lens structure with a smooth scraping and water bath.

The designed lens structure was printed using a Stratasys Objet30 PolyJet 3D printer. The print used a layer thickness of 15 μm with VeroClear transparent material. After the print, the lenses went through post-processing with polishing and clear coating to improve the surface finish and optical properties.

As the final step of the lens design process, ray tracing simulation may be followed by an experimental study using the 3D printed lenses. The study experimentally validated the lens design using results gathered from the 3D printed lens structure. The printed lens was used in a setup consisting of an LED with a near Lambertian distribution.

CCD radiant imaging camera provided the analysis of the relative illuminance distribution on the target plane. Using the extracted values, the ratio between the maximum illuminance to the minimum illuminance value found inside the illuminated perimeter may be determined. According to the experimental data, the optical system was able to achieve a max:min uniformity ratio of 2.1:1 for the circular symmetric distribution, and 2.2:1 for the non-circular symmetric distribution. To determine an overall optical efficiency, the total flux output of the LED without using the fabricated lens was measured. The total flux output for the LED and the lens combination is measured using the integrating sphere. The ratio between these two is defined as the overall optical efficiency of the lens. According to the measurements followed by the calculations, the overall optical efficiency of the lens structure was obtained as 72.1% for the circular symmetric distribution, and 70.1% for the non-circular symmetric distribution.

Figure 13A:
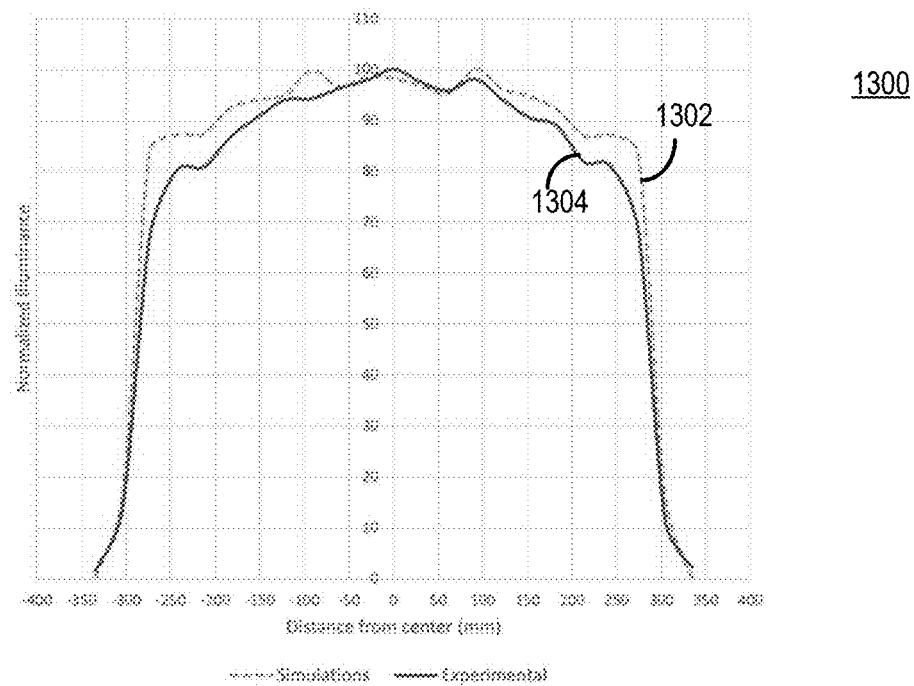
FIGS. 13A and 13B are plots illustrating a comparison of predicted, i.e., simulated, results and experimental results for the circular symmetric freeform illuminance distribution and the non-circular symmetrical freeform illuminance distribution, respectively.
Figure 13B:
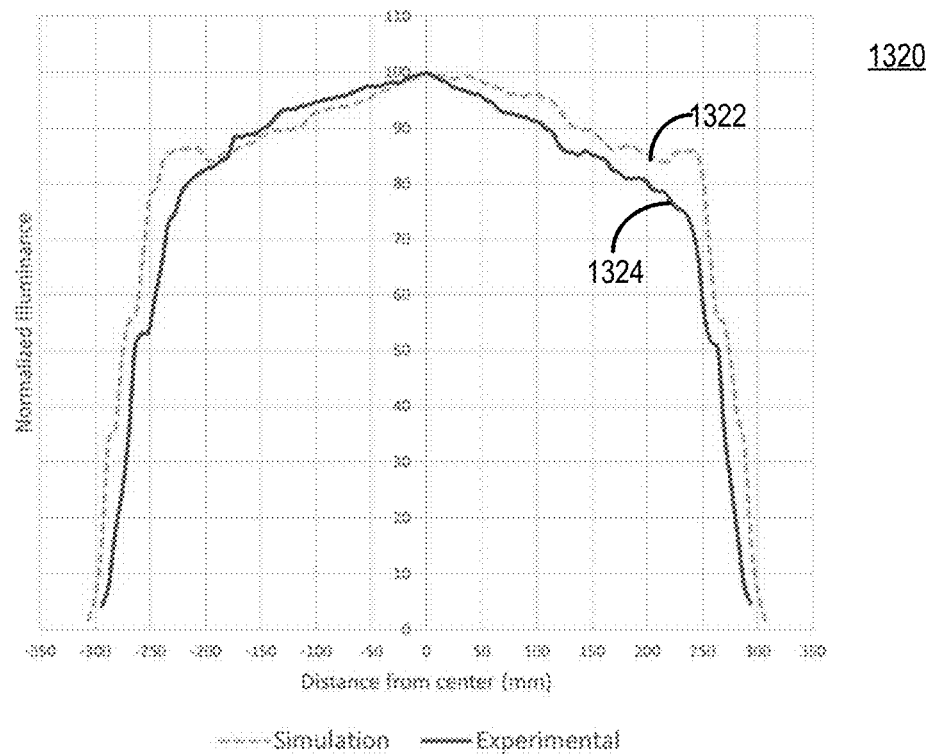

FIGS. 13A and 13B are plots 1300, 1320 illustrating a comparison of predicted, i.e., simulated, results 1302, 1322 and experimental results 1304, 1324 for the circular symmetric freeform illuminance distribution and the non-circular symmetrical freeform illuminance distribution, respectively. These results 1302, 1322, gathered from the ray tracing simulation using the LightTools® and experimental data using the 3D printed lens structure illustrate that a design approach, according to the present disclosure, may be configured to design freeform internal cavity lenses to achieve at least circular symmetrical illuminance distribution. The presented geometrical model, followed by ray tracing and experimental validation illustrate how the presented design strategy can be used to create circular illuminance distribution for illumination applications with higher efficiency and better uniformity.

It may be appreciated that a first operation in a freeform lens design method, according to one embodiment of the present disclosure, may include dividing the total flux from the source and the target distribution into equal segments. The number of divisions may be determined based on the target application operational parameters including, but not limited to, efficiency and uniformity. It may be appreciated that the number of segmentation N may correspond to an optimization design parameter that may be adjusted to achieve a particular output beam distribution.

Efficiency and uniformity for a lens may vary with number of segments. For example, as the number of segments increases, the efficiency of the lens system may increase due to better control of the flux with a higher number of segments. A higher number of segments may be associated with relatively better control of the flux at the edges of the illuminance map, thus creating sharper edges.

Illuminance distribution may vary for lenses with different number of segments. When the number of segments is less, illuminance distribution is shaped towards Gaussian distribution from the desired top hat distribution and hence lowering low illuminance values inside the target area. This leads to a relatively higher uniformity ratio. A further increase in a number of segments may produce fluctuations in the illuminance distribution due to discontinuities in the surface geometry. An optimum number of segments may thus exist configured to achieve a desired beam distribution with relatively higher efficiency and a better uniformity ratio.

Innovation in the field of additive manufacturing optics has led to the development of new materials with superior optical properties and the development of 3D printers with higher resolutions. Because of its ability to create new custom designs at a lower cost and in less time, additive manufacturing offers high potential in optics. 3D printing is capable of producing freeform lenses with complex geometries that may be otherwise unattainable for specific applications.

It may be appreciated that optical additive manufacturing methods may include post-processing techniques (e.g., polishing) configured to improve the properties of the optical components. Selecting an appropriate method or a combination of methods is dependent on the surface geometry and the application environment of the optical system.

Based on the application, LED lighting systems may use secondary optical systems with reflective, refractive, or reflective-refractive combinations to redistribute the original LED beam distribution. Traditional refractive optical systems use external refractive surface geometries to control the beam. The exterior surface structures of such lenses may accumulate dirt over time, reducing the efficiency of lighting fixtures. Conversely, refractive optics with flat, smooth surfaces, and internally located refractive cavities can minimize efficacy drop over time and ease the maintenance and cleaning process. In an embodiment consistent with the present disclosure, a design strategy and manufacturing method for freeform internal cavity lenses for LED lighting systems was provided.

Initially, an internal cavity lens design method for circular symmetrical illuminance distributions using the energy mapping relationship method, edge ray principle, and geometrical optics fundamentals was described. The method was expanded to achieve non-circular symmetrical illuminance distributions. Designed lens structures were first analyzed under a ray tracing simulation environment to assess the performance. After verifying the optical performance of the lens met design goals, physically fabricated lenses were manufactured using 3D printing techniques.

Thus, a freeform internal cavity design strategy for both circular symmetrical and non-circular symmetrically beam shaping applications has been described. The design strategy was validated using ray tracing simulations and experimental studies.

It may be appreciated that the number of equal flux segments and the number of area segments may affect the distribution and the efficiency of the output beam. A design method according to the present disclosure proposed a direct lens design method for internal cavity lenses. Optimization of the number of flux and area segments may facilitate achieving a target beam distribution. Hence, at the last stage of the design process, if the illuminance distribution does not meet a design criterion, the number of divisions may be adjusted and the algorithm rerun to further optimize the lens design.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 1142 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising an optic configured for a selected illumination application, the optic comprising:
    a first lens structure comprising:
        a first planar external surface configured to receive incident light, and
        a first internal nonplanar refractive surface opposing the first planar external surface; and
    a second lens structure comprising:
        a second planar external surface configured to emit output light, and
        a second internal nonplanar refractive surface opposing the second planar external surface,
    the second planar external surface opposing the first planar external surface, the first internal nonplanar refractive surface and the second internal nonplanar refractive surface defining a cavity, the first internal nonplanar refractive surface, the second internal nonplanar refractive surface, and the cavity positioned between the first planar external surface and the second planar external surface, wherein the first internal nonplanar refractive surface and the second internal nonplanar refractive surface are configured to refract received light to yield emitted light having a target output parameter corresponding to the selected illumination application.

2. The apparatus of claim 1, wherein a respective surface refractive geometry of each internal nonplanar refractive surface is determined based, at least in part, on a source parameter associated with a lighting source configured to provide the incident light, and based, at least in part, on a target output parameter associated with the selected illumination application.

3. The apparatus of claim 2, wherein the target output parameter is selected from the group comprising illumination target geometry, illuminance uniformity and application efficiency.

4. The apparatus of claim 1, wherein the cavity contains air.

5. The apparatus of claim 1, wherein at least one of the first internal nonplanar refractive surface and/or the second internal nonplanar refractive surface is freeform.

6. The apparatus of claim 1, wherein a respective surface refraction geometry of each internal nonplanar refractive surface is determined based, at least in part, on a light-energy mapping technique.

7. The apparatus of claim 1, wherein each lens structure is manufactured using a three-dimensional (3D) printing technique.

8. A system configured for a selected illumination application, the system comprising:
    an illumination source; and
    an optic comprising a first lens structure and a second lens structure,
    the first lens structure comprising:
        a first planar external surface configured to receive incident light from the illumination source, and
        a first internal nonplanar refractive surface opposing the first planar external surface, and
    a second lens structure comprising:
        a second planar external surface configured to emit output light, and
        a second internal nonplanar refractive surface opposing the second planar external surface,
        the second planar external surface opposing the first planar external surface, the first internal nonplanar refractive surface and the second internal nonplanar refractive surface defining a cavity, the first internal nonplanar refractive surface, the second internal nonplanar refractive surface, and the cavity positioned between the first planar external surface and the second planar external surface, wherein the first internal nonplanar refractive surface and the second internal nonplanar refractive surface are configured to refract received light to yield emitted light having a target output parameter corresponding to the selected illumination application.

9. The system of claim 8, wherein a respective surface refractive geometry of each internal nonplanar refractive surface is determined based, at least in part, on a source parameter associated with a lighting source configured to provide the incident light, and based, at least in part, on a target output parameter associated with the selected illumination application.

10. The system of claim 9, wherein the target output parameter is selected from the group comprising illumination target geometry, illuminance uniformity and application efficiency.

11. The system of claim 8, wherein the cavity contains air.

12. The system of claim 8, wherein at least one of the first internal nonplanar refractive surface and/or the second internal nonplanar refractive surface is freeform.

13. The system of claim 8, wherein a respective surface refraction geometry of each internal nonplanar refractive surface is determined based, at least in part, on a light-energy mapping technique.

14. The system of claim 8, wherein each lens structure is manufactured using a three-dimensional (3D) printing technique.

* * * * *